(12) United States Patent
Ma et al.

(10) Patent No.: US 12,132,520 B1
(45) Date of Patent: Oct. 29, 2024

(54) PURE-OPTICAL ACTIVE CABLE AND REPEATER

(71) Applicant: EverPro (Wuhan) Technologies Company Limited, Wuhan (CN)

(72) Inventors: Yan Ma, Beijing (CN); Hui Jiang, Beijing (CN); Xinliang Zhou, Beijing (CN)

(73) Assignee: EverPro (Wuhan) Technologies Company Limited, Wuhan (CN)

( * ) Notice: Subject to any disclaimer, the term of this patent is extended or adjusted under 35 U.S.C. 154(b) by 0 days.

(21) Appl. No.: 18/743,060

(22) Filed: Jun. 13, 2024

(30) Foreign Application Priority Data

Jul. 28, 2023 (CN) .......................... 202310943553.X
Jul. 28, 2023 (CN) .......................... 202310956067.1
(Continued)

(51) Int. Cl.
*H04B 10/2575* (2013.01)
*H04B 10/564* (2013.01)
(Continued)

(52) U.S. Cl.
CPC ..... *H04B 10/25751* (2013.01); *H04B 10/564* (2013.01); *H04B 10/697* (2013.01); *H04B 10/29* (2013.01)

(58) Field of Classification Search
None
See application file for complete search history.

(56) References Cited

U.S. PATENT DOCUMENTS 9,979,481 B2 * 5/2018 Parekh ................. G02B 6/3588
10,880,626 B2 * 12/2020 Suzuki ................. G02B 6/3817
(Continued)

FOREIGN PATENT DOCUMENTS

CN    101729839 A    6/2010
CN    205385573 U    7/2016
(Continued)

OTHER PUBLICATIONS

The first office action received in the relevant Chinese Application 2023109560671, mailed on Dec. 26, 2023.
(Continued)

*Primary Examiner* — Jai M Lee
(74) *Attorney, Agent, or Firm* — KILPATRICK TOWNSEND & STOCKTON LLP

(57) ABSTRACT

The disclosure discloses a receiving end/signal transmitting method, a pure-optical active cable and an active cable. The receiving end includes a first high-speed signal optoelectronic transmission module and a first low-speed signal optoelectronic transmission module; a power supply port of the first high-speed signal optoelectronic transmission module being connected with a high-speed signal line of the receiving end, and a power supply port of the first low-speed signal optoelectronic transmission module being connected with the high-speed signal line. When the high-speed signal line of the receiving end is connected to a termination power supply of a display device during signal transmitting, the first high-speed signal optoelectronic transmission module and the first low-speed signal optoelectronic transmission module are capable of acquiring a power supply signal from the high-speed signal line to solve power supply in the receiving end of the pure-optical active cable.

20 Claims, 10 Drawing Sheets

(30) Foreign Application Priority Data

Dec. 27, 2023 (CN) .......................... 202311831687.9
Dec. 27, 2023 (CN) .......................... 202311843231.4

(51) Int. Cl.
*H04B 10/69* (2013.01)
*H04B 10/29* (2013.01)

(56) References Cited

U.S. PATENT DOCUMENTS

| | | | |
|---|---|---|---|
| 11,750,294 B2 * | 9/2023 | Chuang .............. | H04B 10/2589 398/135 |
| 11,995,025 B2 * | 5/2024 | Li ......................... | G06F 13/382 |
| 2022/0337318 A1 | 10/2022 | Bai et al. | |
| 2023/0216583 A1 * | 7/2023 | Yu ........................ | H01R 13/646 398/116 |

FOREIGN PATENT DOCUMENTS

| CN | 208656774 U | 3/2019 |
|---|---|---|
| CN | 109587427 A | 4/2019 |
| CN | 110088827 A | 8/2019 |
| CN | 110719423 A | 1/2020 |
| CN | 210839865 U | 6/2020 |
| CN | 216391268 U | 4/2022 |
| CN | 217883661 U | 11/2022 |
| JP | 2011164943 A | 8/2011 |
| JP | 2013219520 A | 10/2013 |
| WO | 2023111873 A1 | 6/2023 |

OTHER PUBLICATIONS

The first search report received in the relevant Chinese Application 2023109560671, mailed on Dec. 26, 2023.

The Notification to Grant Patent Right for Invention received in the relevant Chinese Application 2023109560671, mailed on Mar. 13, 2024.

The first office action received in the corresponding Chinese Application 202310943553X, mailed Dec. 15, 2023.

The first search report received in the corresponding Chinese Application 202310943553X, mailed Dec. 15, 2023.

* cited by examiner

PURE-OPTICAL ACTIVE CABLE AND REPEATER

CROSS-REFERENCES TO RELATED APPLICATIONS

The present application claims the priority of Chinese Patent Application 2023109560671 filed on Jul. 28, 2023, Chinese Patent Application 2023118432314 filed on Dec. 27, 2023 which claim priority of Chinese Patent Application 202310943553X filed on Jul. 28, 2023 and Chinese Patent Application 2023118316879 filed on Dec. 27, 2023 which claim priority of Chinese Patent Application 202310943553X filed on Jul. 28, 2023, the entire contents of which are hereby incorporated by reference.

TECHNICAL FIELD

The present disclosure generally relates to the field of communications. More particularly, the present disclosure relates to a signal transmitting method, a pure-optical active cable and a repeater.

BACKGROUND

With the development of science and technology and the improvement of people's living standards, people's demand for acquiring high-definition video signals is getting stronger and stronger. Based on this, Digital Visual Interface (DVI), High Definition Multimedia Interface (HDMI) and other audio and video transmission protocols used for communication between a video source and a display device have appeared one after another.

The audio and video transmission process between the video source and the display device includes high-speed signal transmission and low-speed signal transmission. Specifically, in the early technology, the high-speed signals, i.e., video signals, can be transmitted through copper cables or optical fibers to improve a transmission rate and reduce losses. In one embodiment, the transmission of low-speed signals such as Hot Plug Detect (HPD) signal, Serial Clock (SCL) signal, Serial Data (SDA) signal and Consumer Electronics Control (CEC) signal still has various problems. Then, a optoelectronic transparent transmission technology of low-speed signals appeared, which realized connection between a sending end connected with the video source and a receiving end connected with the display device through pure-optical active cables (AOCs). This technology can convert low-speed signals and low-voltage differential signals to each other at the sending end, then carry out optoelectronic conversion, and transmit the signals to the receiving end in the form of light signals in the pure-optical AOC cables, convert the light signals optoelectronically into electrical signals at the receiving end and transmit the signals to the display device.

In practical application, in order to improve an overall transmission length of the cables, such pure-optical AOC cables do not transmit power supply signals, and a high-speed signal optoelectronic transmission module and a low-speed signal optoelectronic transmission module at the receiving end usually adopt Y-Cables (that is, y-cables) to get electricity from a USB interface or other power supply ports of the display device for power supply. In one embodiment, the use of the Y-Cables brings great inconvenience to the application of cables, and such pure-optical AOC cables are limited in an environment where the display device does not provide USB and other power supply ports.

SUMMARY

In order to solve at least one or more problems mentioned above, the present disclosure proposes a receiving end, a signal transmitting method, a pure-optical active cable and an active cable in various embodiments, and power supply ports of a high-speed signal optoelectronic transmission module and a low-speed signal optoelectronic transmission module in the receiving end are respectively connected with a high-speed signal line in the receiving end, to realize power supply for the receiving end by using a termination power supply of a display device.

In one embodiment, the present disclosure provides a receiving end, including: a first high-speed signal optoelectronic transmission module and a first low-speed signal optoelectronic transmission module; and a power supply port of the first high-speed signal optoelectronic transmission module connects to a high-speed signal line of the receiving end, and a power supply port of the first low-speed signal optoelectronic transmission module connects to the high-speed signal line of the receiving end.

In one embodiment of the present disclosure, the receiving end further includes: a noise suppression module; and the power supply port of the first high-speed signal optoelectronic transmission module connects to the high-speed signal line of the receiving end through the noise suppression module, and the noise suppression module is configured for suppressing high-frequency noise and spike interference from the high-speed signal line of the receiving end.

In one embodiment of the present disclosure, the noise suppression module is a magnetic bead.

In one embodiment of the present disclosure, the receiving end further includes: a power switch and a controller; and the power supply port of the first low-speed signal optoelectronic transmission module connects to the high-speed signal line of the receiving end through the power switch; and the controller is configured for controlling on-off of the power switch.

In one embodiment of the present disclosure, the controller is further provided with a configuration interface connected with the first low-speed signal optoelectronic transmission module; and the controller is also used for configuring the first low-speed signal optoelectronic transmission module to work normally through the configuration interface.

In one embodiment of the present disclosure, the controller is integrated in the first high-speed signal optoelectronic transmission module.

In another embodiment, the present disclosure provides a signal transmitting method which is applied in a receiving end connected to one end of an optical fiber, the receiving end includes a first high-speed signal optoelectronic transmission module and a first low-speed signal optoelectronic transmission module, a power supply port of the first high-speed signal optoelectronic transmission module connects to a high-speed signal line of the receiving end, a power supply port of the first low-speed signal optoelectronic transmission module connects to the high-speed signal line of the receiving end through a power switch, the other end of the optical fiber connects to a sending end, and the sending end includes a second high-speed signal optoelectronic transmission module and a second low-speed signal optoelectronic transmission module. The method includes: when the receiving end is plugged into a destination end, acquiring, by the first high-speed signal optoelectronic transmission module, electric power from the high-speed signal line of the receiving end; acquiring, by the first low-speed signal optoelectronic transmission module, electric power from the high-speed signal line of the receiving end; and converting, by the first low-speed signal optoelectronic transmission module, a low-speed light signal received from an optical fiber into a first low-speed electrical signal and transmitting the first low-speed electrical signal to the destination end; and the low-speed light signal is converted from the first low-speed electrical signal by the second low-speed signal optoelectronic transmission module and transmitted to the optical fiber, and when the sending end is plugged into the source, the second low-speed signal optoelectronic transmission module receives the first low-speed electrical signal from the source.

In one embodiment of the present disclosure, the receiving end further includes a controller and a power switch. The method further includes: in response to the destination end being waken up, controlling, by the controller, the power switch to turn on, and the first low-speed signal optoelectronic transmission module acquires electric power from the high-speed signal line of the receiving end.

In one embodiment of the present disclosure, the controller is further provided with a configuration interface connected with the first low-speed signal optoelectronic transmission module. The method further includes: when the first high-speed signal optoelectronic transmission module has not received a high-speed light signal for a preset time period, setting, by the first high-speed signal optoelectronic transmission module, a light signal idle flag thereof to a valid state.

In one embodiment of the present disclosure, the receiving end further includes a controller and power switch, and the power supply port of the first low-speed signal optoelectronic transmission module connects to the high-speed signal line of the receiving end through the power switch. The method further includes: in response to the light signal idle flag of the first high-speed signal optoelectronic transmission module being in the valid state, controlling, by the controller, the power switch to be turned off.

In one embodiment of the present disclosure, the method further includes: after the first high-speed signal optoelectronic transmission module receives a first preset high-speed light signal transmitted from the optical fiber, setting, by the first high-speed signal optoelectronic transmission module, the light signal idle flag thereof to an invalid state, and converting the first preset high-speed light signal into a first preset high-speed electrical signal, and then outputting the first preset high-speed electrical signal to the destination end; wherein, when a low-speed signal monitoring function of the second high-speed signal optoelectronic transmission module monitors a second low-speed electrical signal on a low-speed data line, the second high-speed signal optoelectronic transmission module generates the first preset high-speed electrical signal, and converts the first preset high-speed electrical signal into the first preset high-speed light signal and transmits the first preset high-speed light signal to the optical fiber; and in response to the light signal idle flag of the first high-speed signal optoelectronic transmission module being in the invalid state, the controller controls the power switch is turned on, the power supply of the first low-speed signal optoelectronic transmission module becomes normal, and the first low-speed signal optoelectronic transmission module starts working normally.

In one embodiment of the present disclosure, the method further includes: after the first high-speed signal optoelectronic transmission module receives a second preset high-speed light signal transmitted from the optical fiber, setting, by the first high-speed signal optoelectronic transmission module, the light signal idle flag thereof to an invalid state, and converting the second preset high-speed light signal into a second preset high-speed electrical signal, and then outputting the second preset high-speed electrical signal to the destination end; and after the second high-speed signal optoelectronic transmission module receives the second preset high-speed electrical signal transmitted by the source after being awakened, the second high-speed signal optoelectronic transmission module converts the second preset high-speed electrical signal into the second preset high-speed light signal, and then transmits the second preset high-speed light signal to the optical fiber; and in response to the light signal idle flag of the first high-speed signal optoelectronic transmission module being in the invalid state, the controller controls the power switch to be turned on, the power supply of the first low-speed signal optoelectronic transmission module becomes normal, and the first low-speed signal optoelectronic transmission module starts working normally.

In another embodiment, the present disclosure provides a pure-optical active cable, including a receiving end, an optical fiber and a sending end, and the receiving end includes: a first high-speed signal optoelectronic transmission module and a first low-speed signal optoelectronic transmission module; a power supply port of the first high-speed signal optoelectronic transmission module connects to a high-speed signal line of the receiving end, and a power supply port of the first low-speed signal optoelectronic transmission module connects to the high-speed signal line of the receiving end; the sending end includes: a second high-speed signal optoelectronic transmission module and a second low-speed signal optoelectronic transmission module; and the second high-speed signal optoelectronic transmission module connects to the first high-speed signal optoelectronic transmission module through the optical fiber, and the second low-speed signal optoelectronic transmission module connects to the first low-speed signal optoelectronic transmission module through a second optical fiber.

In one embodiment of the present disclosure, when the receiving end is plugged to a destination end, and the sending end is plugged to a source, the first high-speed signal optoelectronic transmission module acquires electric power from the high-speed signal line of the receiving end; and the first low-speed signal optoelectronic transmission module acquires electric power from the high-speed signal line of the receiving end; and the second high-speed signal optoelectronic transmission module and the second low-speed signal optoelectronic transmission module respectively acquire electric power from the source; the second low-speed signal optoelectronic transmission module converts a first low-speed electrical signal received from the source into a low-speed light signal and transmits the low-speed light signal to the first low-speed signal optoelectronic transmission module through the second optical fiber; and the first low-speed signal optoelectronic transmission module converts the low-speed light signal into the first low-speed electrical signal and transmits the first low-speed electrical signal to the destination end.

In one embodiment of the present disclosure, the receiving end further includes a controller and a power switch, the controller controls the power switch to turn on, and the first low-speed signal optoelectronic transmission module acquires electric power from the high-speed signal line of the receiving end.

In one embodiment of the present disclosure, the controller is further provided with a configuration interface connected with the first low-speed signal optoelectronic transmission module, and the controller configures the first low-speed signal optoelectronic transmission module to work normally through the configuration interface.

In one embodiment of the present disclosure, when the second high-speed signal optoelectronic transmission module recognizes that the source enters a dormant state, the second high-speed signal optoelectronic transmission module sets an electrical signal idle flag thereof to a valid state and stops sending a high-speed light signal to the first high-speed signal optoelectronic transmission module; the second high-speed signal optoelectronic transmission module enables a low-speed signal monitoring function of the second high-speed signal optoelectronic transmission module; and when the first high-speed signal optoelectronic transmission module does not receive a high-speed light signal for a preset time period, the first high-speed signal optoelectronic transmission module sets a light signal idle flag thereof to a valid state.

In one embodiment of the present disclosure, the receiving end further includes a controller and a power switch, the power supply port of the first low-speed signal optoelectronic transmission module connects to the high-speed signal line of the receiving end through the power switch, and when the first high-speed signal optoelectronic transmission module does not receive the high-speed light signal for a preset time period, the controller controls the power switch to be turned off.

In one embodiment of the present disclosure, when the low-speed signal monitoring function of the second high-speed signal optoelectronic transmission module monitors a second low-speed electrical signal on a low-speed data line, the second high-speed signal optoelectronic transmission module generates a first preset high-speed electrical signal, and converts the first preset high-speed electrical signal into a first preset high-speed light signal and transmits the first preset high-speed light signal to the optical fiber; the second high-speed signal optoelectronic transmission module is converted to a normal transmission mode; the second low-speed signal optoelectronic transmission module configures the second low-speed signal optoelectronic transmission module to be in a normal working mode; after the first high-speed signal optoelectronic transmission module receives the first preset high-speed light signal transmitted from the optical fiber, the first high-speed signal optoelectronic transmission module sets the light signal idle flag thereof to the invalid state, and converts the first preset high-speed light signal into the first preset high-speed electrical signal, and then outputs the first preset high-speed electrical signal to the destination end; and in response to the light signal idle flag of the first high-speed signal optoelectronic transmission module being in the invalid state, the controller controls the power switch to be turned on, the power supply of the first low-speed signal optoelectronic transmission module becomes normal, and the first low-speed signal optoelectronic transmission module starts working normally.

In one embodiment of the present disclosure, a second high-speed signal receiving module receives a second preset high-speed electrical signal sent by a video source after being awakened; the second high-speed signal optoelectronic transmission module converts the second preset high-speed electrical signal into a second preset high-speed light signal and then transmits the second preset high-speed light signal to the optical fiber; the second high-speed signal optoelectronic transmission module is converted to a normal transmission mode; after the first high-speed signal optoelectronic transmission module receives a second preset high-speed light signal transmitted from the optical fiber, the first high-speed signal optoelectronic transmission module sets the light signal idle flag thereof to an invalid state, and converts the second preset high-speed light signal into a second preset high-speed electrical signal, and then outputs the second preset high-speed electrical signal to the destination end; in response to the light signal idle flag of the first high-speed signal optoelectronic transmission module being in the invalid state, the controller controls the power switch to be turned on, the power supply of the first low-speed signal optoelectronic transmission module becomes normal, and the first low-speed signal optoelectronic transmission module starts working normally; and the second low-speed signal optoelectronic transmission module configures the second low-speed signal optoelectronic transmission module to be in a normal working mode.

In one embodiment of the present disclosure, the pure-optical active cable further includes: an adapter and a connector; the second high-speed signal optoelectronic transmission module connects to the first high-speed signal optoelectronic transmission module through the optical fiber after passing through at least one section of adapting optical fiber, and the second low-speed signal optoelectronic transmission module connects to the first low-speed signal optoelectronic transmission module through the optical fiber after passing through the at least one section of adapting optical fiber; and all sections of adapting optical fibers are connected in sequence, and switching between two adjacent optical fibers is realized by setting adapters at ends of two optical fibers to be connected and inserting the adapters into connectors.

According to the receiving end provided above, the power supply port of the first high-speed signal optoelectronic transmission module of the receiving end connects to the high-speed signal line of the receiving end, the power supply port of the first low-speed signal optoelectronic transmission module of the receiving end connects to the high-speed signal line of the receiving end, while the high-speed signal line of the receiving end connects to the termination power supply of the display device during signal transmitting. When the receiving end is plugged into the destination end, the first high-speed signal optoelectronic transmission module can acquire electric power from the high-speed signal line of the receiving end, and the first low-speed signal optoelectronic transmission module can acquire electric power from the high-speed signal line of the receiving end, and the power supply of the first high-speed signal optoelectronic transmission module and the low-speed signal optoelectronic transmission module at the receiving end of the pure-optical active cable can be realized by using the termination power supply, and the use of the Y-Cable at the receiving end of the pure-optical active cable can be cancelled. The receiving end can adapt to an environment that the display device is not provided with a USB and other power supply ports, and effectively solve the problems that audio and video signals are transmitted for a long distance by using the pure-optical active cable and the display device is inconvenient to provide power supply ports for the receiving end of the pure-optical active cable.

Further, some embodiments of the present disclosure also provide a receiving end, and a controller in the receiving end controls on-off of a power switch, and the power switch controls on-off of a power supply port of a first low-speed signal optoelectronic transmission module and a high-speed signal line of the receiving end, and the power switch ensures that the power supply port of the first low-speed signal optoelectronic transmission module is disconnected from the high-speed signal line of the receiving end when or before the receiving end is connected to a destination end. Therefore, at the moment that the receiving end is connected to the destination end, although the first high-speed signal optoelectronic transmission module is in a power supply state, the first low-speed signal optoelectronic transmission module is in a power-off state, which can reduce current impact of the connection moment on an output current of the destination end.

According to some embodiments of the present disclosure, a high-speed signal optoelectronic transmission module and a low-speed signal optoelectronic transmission module at a receiving end of a pure-optical transparent AOC cable are powered by a termination power supply voltage (Avcc) of a high-speed signal line of a display device, and the use of Y-Cable at the receiving end of the cable can be cancelled. The AOC of these embodiments may be applied to any other video source-display device combination except for a display device that needs to be provided with 5 V to wake up from a dormant state.

According to some embodiments of the present disclosure, through the light signal communication at the sending end/receiving end and a power-on and power-off sequence of the high-speed signal optoelectronic transmission module and the low-speed signal optoelectronic transmission module of the receiving end, the pure-optical AOC can still work normally in various situations such as plugging, dormancy, waking up and the like under the condition that the termination power supply voltage Avec of the high-speed signal line of the display device is insufficient.

According to some embodiments of the present disclosure, through a low-speed signal monitoring function of the high-speed signal optoelectronic transmission module of the sending end, and the light signal communication of the high-speed signal optoelectronic transmission module at the sending end/receiving end, in the case that a low-speed signal appears first when the video source wakes up, even if the low-speed signal cannot be transmitted to the display device (because a power supply switch of the low-speed signal optoelectronic transmission module of the receiving end has not been turned on at this time), a high-speed signal can be simulated to be transmitted to the receiving end and the display device in a short time, and the display device is waken up, and then the power of the termination supply voltage Avec of the high-speed signal line is normally supplied.

In one embodiment, the present disclosure provides a repeater used for connecting a signal sending end and a signal receiving end, and forwarding a signal from the signal sending end to the signal receiving end, and the repeater includes: a voltage input end and a voltage output end, and the voltage input end is configured for receiving a voltage signal from other than the signal sending end, the voltage output end includes a first voltage output end for connecting the signal receiving end, and the repeater is configured for outputting the received voltage signal to the first voltage output end.

In some embodiments, the repeater includes an HDMI connector used for connecting the signal receiving end, the first voltage output end is a power output pin of the HDMI connector, and the voltage input end includes a first connector.

In some embodiments, the repeater further includes: a high-speed signal line, and a high-speed signal line of the repeater is configured for connecting a high-speed signal line of the signal sending end.

In some embodiments, the repeater includes a second connector for connecting the signal sending end, the second connector connects to the high-speed signal line of the repeater, and the high-speed signal line of the repeater connects to the high-speed signal line of the signal sending end through the second connector; and the second connector connects to the first connector, and the first connector outputs the received voltage signal to the second connector.

In some embodiments, the repeater further includes: a signal processing chip; and the signal processing chip is configured for forwarding a high-speed signal and/or a low-speed signal from the signal sending end to the signal receiving end.

In some embodiments, the signal processing chip connects to the first connector, and the first connector outputs the received voltage signal to the signal processing chip.

In some embodiments, a power input pin of the first connector connects to the power output pin of the HDMI connector.

In some embodiments, the repeater further includes: a voltage converting circuit; and an input end of the voltage converting circuit is configured for receiving the voltage signal, and an output end of the voltage converting circuit is connected to a high-speed signal line between the first high-speed signal optoelectronic transmission module and the repeater through a magnetic bead.

In some embodiments, the repeater further includes: a controller and a switch, and an output end of the controller connects to a control end of the switch, an input end of the switch connects to a power input pin of the first connector, and an output end of the switch connects to the power output pin of the HDMI connector; the controller is configured for controlling the switch to be turned on or off, which includes: in response to that the second connector receives the signal from the signal sending end, controlling, by the controller, the switch to be turned on or off.

In some embodiments, the repeater further includes a switch circuit, the second connector further includes a voltage input pin, a first input end of the switch circuit connects to a voltage input pin of the second connector, a second input end of the switch circuit connects to the power input pin of the first connector, and an output end of the switch circuit connects to the power output pin of the HDMI connector; in response to a voltage of the voltage input pin of the second connector being less than a first threshold, the switch circuit connects the second input end of the switch circuit with the output end of the switch circuit; and in response to the voltage of the voltage input pin of the second connector being greater than or equal to the first threshold, the switch circuit connects the first input end of the switch circuit with the output end of the switch circuit.

In some embodiments, the repeater includes: an HDMI female connector, an HDMI male connector and a Y-Cable; the HDMI female connector is configured for connecting the signal sending end; the HDMI male connector is configured for connecting the signal receiving end; the Y-Cable includes a first connector; the voltage input end is a power input pin of the first connector; the first voltage output end is a power output pin of the HDMI male connector; and the power input pin of the first connector connects to the power output pin of the HDMI male connector through the Y-Cable.

In some embodiments, the power input pin of the HDMI female connector is not connected with the power output pin of the HDMI male connector.

In some embodiments, the present disclosure provides a receiving end plug, including: the repeater according to any one of the embodiments.

In some embodiments, the receiving end plug further includes: a first high-speed signal optoelectronic transmission module and a first low-speed signal optoelectronic transmission module, and a power supply port of the first high-speed signal optoelectronic transmission module connects to a high-speed signal line of the repeater.

In some embodiments, a voltage output end of the repeater further includes: a second voltage output end; and a power supply port of the first low-speed signal optoelectronic transmission module connects to the second voltage output end to acquire a voltage signal received by the repeater from a voltage input end.

In some embodiments, the power supply port of the first low-speed signal optoelectronic transmission module connects to the high-speed signal line of the repeater.

In some embodiments, the repeater is detachably connected with the receiving end plug through an adapter, or the repeater is integrated in the receiving end plug.

In one embodiment, the present disclosure an active cable, including: a sending end plug, an optical cable and the receiving end plug according to the embodiments; and the sending end plug is configured for connecting a source.

In some embodiments, the receiving end plug includes a first high-speed signal optoelectronic transmission module and a first low-speed signal optoelectronic transmission module; the sending end plug includes a second high-speed signal optoelectronic transmission module and a second low-speed signal optoelectronic transmission module; and the second high-speed signal optoelectronic transmission module connects to the first high-speed signal optoelectronic transmission module through the optical cable; the second low-speed signal optoelectronic transmission module connects to the first low-speed signal optoelectronic transmission module through a second optical cable; a power supply port of the first high-speed signal optoelectronic transmission module connects to a high-speed signal line of the repeater; and the power supply port of the first high-speed signal optoelectronic transmission module connects to the high-speed signal line of the receiving end, or connected to a second voltage output end of the repeater.

In one embodiment, the present disclosure provides a signal transmitting method which is applied to a repeater, the repeater includes a voltage input end and a voltage output end, the voltage input end is configured for receiving a voltage signal from other than the signal sending end, the voltage output end includes a first voltage output end for connecting the signal receiving end, and the repeater is configured for outputting the received voltage signal to the first voltage output end. The method includes: in response to the received voltage signal, transmitting, by the repeater, the voltage signal to the signal receiving end to provide a first voltage signal needed by the signal receiving end.

In some embodiments, the repeater includes a switch circuit and a second connector for connecting the signal sending end, and the second connector further includes a voltage input pin. The method further includes: in response to a voltage of the voltage input pin of the second connector being less than a first threshold, connecting, by the switch circuit, the voltage input end with the output end of the switch circuit; and in response to the voltage of the voltage input pin of the second connector being greater than or equal to the first threshold, connecting, by the switch circuit, the voltage input pin of the second connector with the output end of the switch circuit.

In some embodiments, the repeater includes a first connector, a controller, a switch and a second connector used for connecting the signal sending end, and an output end of the controller connects to a control end of the switch; an input end of the switch connects to the voltage input end through the first connector, and an output end of the switch connects to the first voltage output end. The method further includes: in response to that the repeater receives the signal from the signal sending end, controlling, by the controller, the switch to be turned on.

In some embodiments, the second connector connects to a high-speed signal line of the repeater, and the second connector connects to the first connector. The method further includes: in response to that the repeater receives the voltage, transmitting, by the repeater, the voltage to the high-speed signal line of the receiving end to serve as a power supply signal of a optoelectronic transmission module of the receiving end plug.

In some embodiments, the repeater includes a voltage converting circuit, an input end of the voltage converting circuit is configured for receiving the voltage, and an output end of the voltage converting circuit is connected to the high-speed signal line of the receiving end; and transmitting, by the repeater, the voltage to the high-speed signal line of the receiving end, includes: converting, by the voltage converting circuit, the voltage into a step-down signal and transmitting the step-down signal to the high-speed signal line of the receiving end.

In some embodiments, the optoelectronic transmission module in the receiving end plug includes a first high-speed signal optoelectronic transmission module and a first low-speed signal optoelectronic transmission module, a power supply port of the first high-speed signal optoelectronic transmission module connects to a high-speed signal line of the receiving end plug, and a power supply port of the first low-speed signal optoelectronic transmission module connects to the high-speed signal line of the receiving end plug. The method further includes: in response to that the repeater receives a voltage, transmitting, by the repeater, the voltage to the high-speed signal line; in response to that the first high-speed signal optoelectronic transmission module receives a high-speed electrical signal, acquiring, by the first high-speed signal optoelectronic transmission module, a power supply signal from the high-speed signal line of the receiving end plug; and in response to that the first low-speed signal optoelectronic transmission module receives a low-speed electrical signal, acquiring, by the first low-speed signal optoelectronic transmission module, the power supply signal from the high-speed signal line of the receiving end plug.

In some embodiments, the optoelectronic transmission module in the receiving end plug includes a first high-speed signal optoelectronic transmission module and a first low-speed signal optoelectronic transmission module, a power supply port of the first high-speed signal optoelectronic transmission module connects to a high-speed signal line of the receiving end plug, and a power supply port of the first low-speed signal optoelectronic transmission module connects to a second voltage output end of the repeater. The method further includes: in response to that the repeater receives a voltage, transmitting, by the repeater, the voltage to the high-speed signal line; in response to that the first high-speed signal optoelectronic transmission module receives a high-speed electrical signal, acquiring, by the first high-speed signal optoelectronic transmission module, a power supply signal from the high-speed signal line of the receiving end plug; and in response to that the first low-speed signal optoelectronic transmission module receives a low-speed electrical signal, acquiring, by the first low-speed signal optoelectronic transmission module, the power supply signal from the second voltage output end.

In some embodiments, the high-speed signal line of the repeater connects to the high-speed signal line of the receiving end plug, and a low-speed signal line of the repeater connects to a low-speed signal line of the receiving end plug. The method further includes: converting, by the first high-speed signal optoelectronic transmission module, the received high-speed light signal into a first high-speed electrical signal, and transmitting the first high-speed electrical signal to the signal receiving end via the receiving end plug and the high-speed signal line of the repeater; and converting, by the first high-speed signal optoelectronic transmission module, the received low-speed light signal into a first low-speed electrical signal, and transmitting the first low-speed electrical signal to the signal receiving end via the receiving end plug and the low-speed signal line of the repeater.

Through the repeater provided above, the embodiments of the present disclosure can acquire the voltage from other than the signal sending end from the voltage input end of the repeater, and transmit the voltage to the first voltage output end of the signal receiving end through the voltage output end of the repeater, to provide a 5V voltage for a power input pin of an interface in the signal receiving end for receiving multimedia signals, to light up a display device at the signal receiving end to wake the display device up from a sleep mode, thus effectively solving a power supply compatibility problem in a multimedia signal transmission process.

BRIEF DESCRIPTION OF THE DRAWINGS

The above and other embodiments of the present disclosure will become more apparent by reading the following detailed description with reference to the drawings. In the drawings, several embodiments of the present disclosure are illustrated by way of example and not limitation, and the same or corresponding reference numerals indicate the same or corresponding parts, and.

DETAILED DESCRIPTION OF THE EMBODIMENTS

The following describes the solutions in the embodiments of the present disclosure with reference to the drawings in the embodiments of the present disclosure. Apparently, the described embodiments are merely some but not all of the embodiments of the present disclosure.

It should also be noted that the terminologies used in the specification of the present disclosure are for the purpose of describing specific embodiments only and are not intended to limit the embodiments of the present disclosure. As use in the specification and claims of the present disclosure, the singular forms "a," "an, "and" the" are intended to include the plural forms unless the context clearly indicates otherwise. It should also be further understood that the terminology "and/or" used in the specification and claims of the present disclosure refers to any combination and all possible combinations of one or more of the associated listed items, and includes these combinations.

As used in the specification and claims, the terminology "if" can be interpreted as "when" or "once" or "in response to determining" or "in response to detecting" depending on the context. Similarly, the phrases "if it is determined" or "if [described condition or event] is detected" can be interpreted as meaning "once determined" or "in response to determining" or "once [described condition or event] is detected" or "in response to detecting [described condition or event]" depending on the context.

Figure 1:
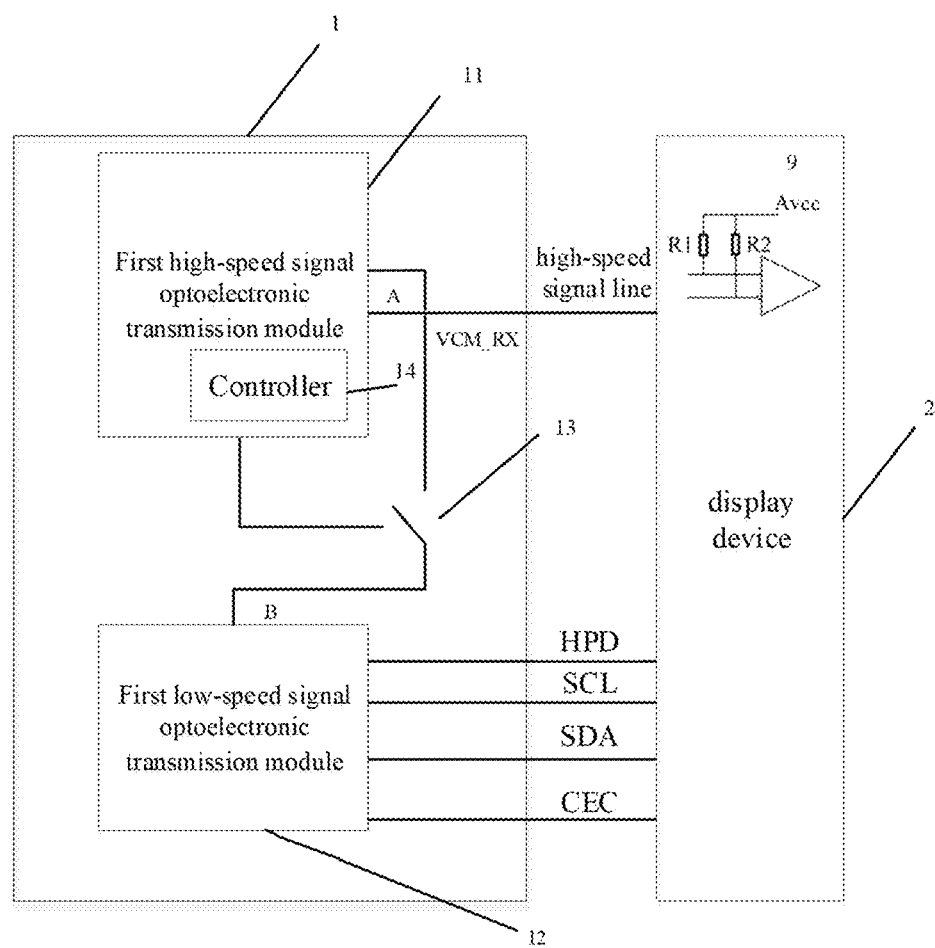
FIG. 1 illustrates a schematic structural diagram of a receiving end provided by the embodiments of the present disclosure.

Referring to FIG. 1, FIG. 1 shows a schematic structural diagram of a receiving end provided by an embodiment of the present disclosure. The receiving end 1 shown in FIG. 1 is configured to communicate with a display device 2 through a high-speed signal line and a low-speed signal line during a signal transmitting process, and includes: a first high-speed signal optoelectronic transmission module 11 and a first low-speed signal optoelectronic transmission module 12. A power supply port (A) of the first high-speed signal optoelectronic transmission module 11 connects to a high-speed signal line of the receiving end 1, and a power supply port B of the first low-speed signal optoelectronic transmission module 12 connects to a high-speed signal line of the receiving end 1.

During signal transmitting, the receiving end 1 performs optoelectronic conversion on a high-speed light signal and a low-speed light signal transmitted by a pure-optical active cable to which the receiving end 1 belongs, and then transmits the high-speed light signal and the low-speed light signal to the display device 2. The high-speed light signal in the transmission of the pure-optical active cable is a light signal obtained by electro-optical conversion of a video signal, while the low-speed light signal includes the light signal obtained by electro-optical conversion such as an Hot Plug Detection (HPD) signal, an Serial Clock Line (SCL) signal, an Serial Clock Line (SDA) signal, a Consumer Electronics Control (CEC) signal and an Extended Display Identification Data (EDID) signal. When receiving the high-speed light signal, the first high-speed signal optoelectronic transmission module 11 of the receiving end 1 converts the high-speed light signal back into a video signal and transmits the video signal to the display device 2, while when receiving the low-speed light signal, the first low-speed signal optoelectronic transmission module 12 converts the low-speed light signal back into an HPD signal, an SCL signal, an SDA signal, a CEC signal and an EDID signal and transmits these signals to the display device 2.

During signal transmitting, the high-speed signal line is connected to a termination power supply Avcc of the display device 2. In this embodiment, the termination power supply may be understood as a termination supply voltage in an HDMI1.4 protocol, that is, Termination Supply Voltage, which can provide a minimum power supply of 3.3 V/80 mA.

Further, during signal transmitting, one connection mode of connecting the high-speed signal line to the termination power supply Avcc of the display device 2 is as follows: the high-speed signal line connects to the termination power supply of the display device through two pull-up resistors R1 and R2, and then the termination power supply supplies power to the high-speed signal line. Values of the termination power supply and the pull-up resistor may be set according to the requirements of the HDMI1.4 protocol, which are not limited by the embodiments of the present disclosure.

It should be noted that during actual application, the display device 2 is presented as a display device such as a monitor.

In some embodiments, in order to suppress electromagnetic interference generated by the high-speed signal line to the power supply port, the receiving end 1 may further include a noise suppression module. The power supply port A of the first high-speed signal optoelectronic transmission module 11 connects to the high-speed signal line through the noise suppression module for suppressing high-frequency noise and spike interference on the high-speed signal line, which can effectively filter out influence on the integrity of the high-speed signal caused by power supply.

Further, the noise suppression module may be a magnetic bead. In other embodiments, the noise suppression module may also be an electronic device such as a filter capacitor and a common mode choke, which can suppress high-frequency noise and spike interference.

Because the receiving end 1 is provided with two optoelectronic transmission modules, which are the first high-speed signal optoelectronic transmission module 11 and the first low-speed signal optoelectronic transmission module 12, if both optoelectronic transmission modules take power from the high-speed signal, there may be insufficient power supply when the display device is dormant or other power supply is reduced. In view of the above situation, the receiving end 1 provided by some embodiments of the present disclosure further includes: a power switch 13 and a controller 14 for controlling the power switch 13. The power supply port B of the first low-speed signal optoelectronic transmission module 12 connects to the high-speed signal line through the power switch 13.

For example, as shown in FIG. 1, the power supply port B of the first low-speed signal optoelectronic transmission module 12 is connected to an electrical connection point VCM_RX on the high-speed signal line through the power switch 13, and the power supply port A of the first high-speed signal optoelectronic transmission module 11 may be connected to the same electrical connection point VCM_RX on the high-speed signal line. When a contact of the power switch 13 connects to the electrical connection point VCM_RX, both the first high-speed signal optoelectronic transmission module 11 and the first low-speed signal optoelectronic transmission module 12 in the receiving end 1 can be directly powered by the high-speed signal line. This power supply method may also be applied in an environment where the display device 2 is not provided with a power supply port such as USB.

It can be understood that in some embodiments, the power supply port A of the first high-speed signal optoelectronic transmission module 11 can be connected to the electrical connection point VCM_RX on the high-speed signal line through the noise suppression module described above, for example, through the magnetic bead, to suppress the influence of the high-speed signal line on the power supply port.

Furthermore, it can be understood that in other embodiments of the present disclosure, the power switch 13 and the power supply port A of the first high-speed signal optoelectronic transmission module 11 may also be connected to different electrical connection points on the high-speed signal line.

Further, the controller 14 for controlling the on-off of the power switch 13 may be integrated in the first high-speed signal optoelectronic transmission module 11. In other embodiments, the controller 14 may be independent of the first high-speed signal optoelectronic transmission module 11, but the integrated entire design is more compact. Specifically, in some embodiments, the controller 14 may use General Purpose Input Output (GPIO) to control the on-off of the power switch 13 to control the power-on and power-off of the first low-speed signal optoelectronic transmission module 12. In one embodiment, the embodiment of the present disclosure is not limited to this, and other methods that can be used to control the on-off of the switch in the prior art can also be applied to the embodiment of the present disclosure.

In order to realize initialization of the first low-speed signal optoelectronic transmission module 12 after power-on, in one embodiment of the present disclosure, any of the above controllers 14 is also provided with a configuration interface connected with the first low-speed signal optoelectronic transmission module 12, and the controller 14 is also used for configuring the first low-speed signal optoelectronic transmission module 12 to work normally through the configuration interface, that is, to realize an initialization process of the first low-speed signal optoelectronic transmission module 12. After the configuration, the first low-speed signal optoelectronic transmission module 12 is ready for optoelectronic conversion and transmission of the low-speed signal, and may be used for receiving and optoelectronic conversion of the low-speed light signal in the pure-optical active cable subsequently.

It should be noted that during actual application, one controller may also be separately configured for the first low-speed signal optoelectronic transmission module 12 to configure the first low-speed signal optoelectronic transmission module 12 to work normally. It is not uniquely limited here.

The receiving end 1 provided by the embodiment of the present disclosure is provided with the first high-speed signal optoelectronic transmission module 11 and the first low-speed signal optoelectronic transmission module 12, and the power supply port of the first high-speed signal optoelectronic transmission module 11 connects to the high-speed signal line of the receiving end 1, and the power supply port of the first low-speed signal optoelectronic transmission module 12 in the receiving end connects to the high-speed signal line of the receiving end 1, while the high-speed signal line of the receiving end 1 is connected to the termination power supply of the display device 2 during signal transmitting. Therefore, when the receiving end is plugged into the destination end (display device 2), the first high-speed signal optoelectronic transmission module 11 can acquire electric power from the high-speed signal line, and the first low-speed signal optoelectronic transmission module 12 can acquire electric power from the high-speed signal line, and the first high-speed signal optoelectronic transmission module 11 and the low-speed signal optoelectronic transmission module 12 at the receiving end of the pure-optical active cable can be powered by the termination power supply Avcc, and use of a Y-Cable at the receiving end of the pure-optical active cable can be cancelled, which can adapt to the environment that the display device 2 is not provided with the USB and other power supply ports, and problems that audio and video signals are transmitted for a long distance by using the pure-optical active cable and the display device is inconvenient to provide a power supply port for the receiving end of the pure-optical active cable are effectively solved.

Corresponding to any of the aforementioned receiving ends, the present disclosure further provides a signal transmitting method.

Figure 5:
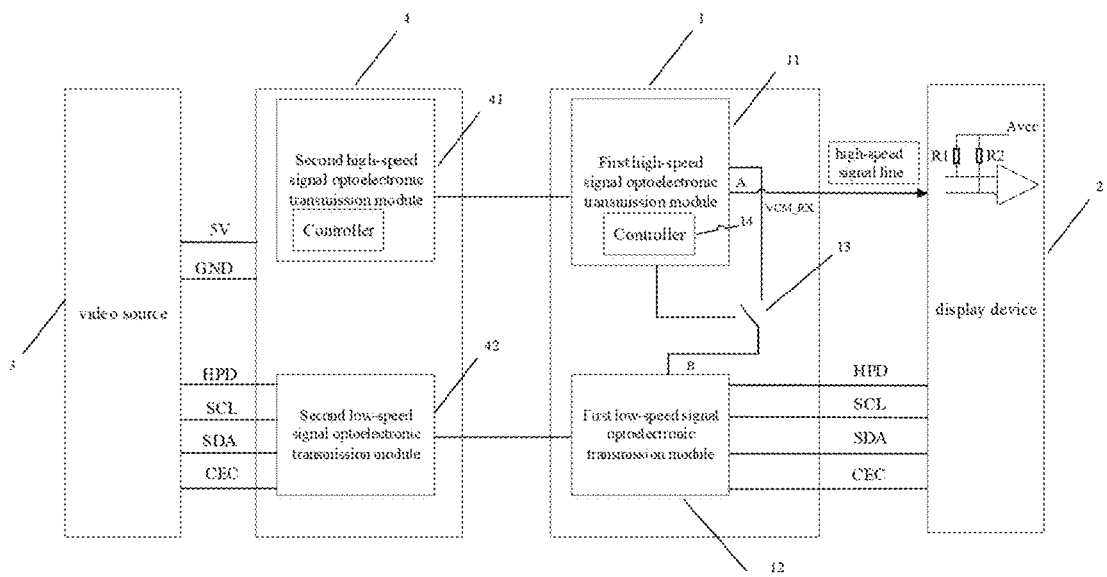
FIG. 5 illustrates a schematic structural diagram of a pure-optical active cable according to the embodiments of the present disclosure.

The method is applied to a receiving end 1 connected to one end of an optical fiber, and the other end of the optical fiber is connected to a sending end 4 (as shown in FIG. 5), and the sending end 4 includes a second high-speed signal optoelectronic transmission module 41 and a second low-speed signal optoelectronic transmission module 42.

The signal transmitting method according to the embodiment of the present disclosure is described below.

Figure 2:
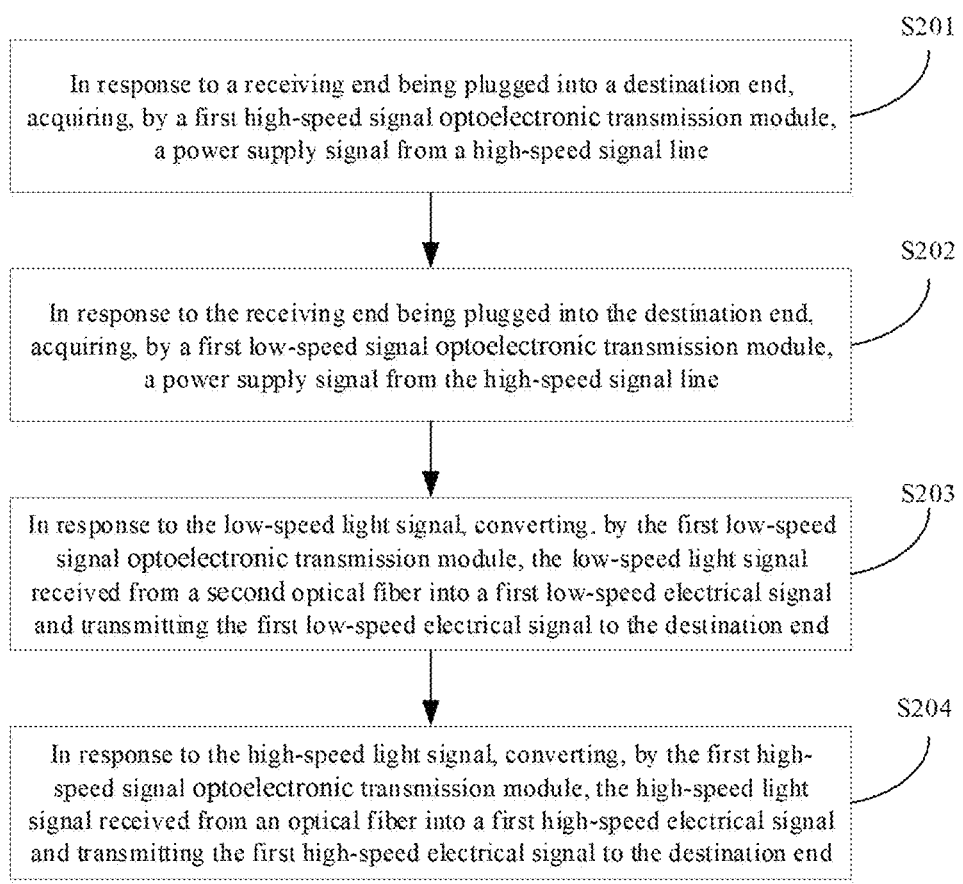
FIG. 2 illustrates a schematic flowchart of a signal transmitting process according to the embodiments of the present disclosure.

Referring to FIG. 2, FIG. 2 shows a schematic flowchart of a signal transmitting method provided by an embodiment of the present disclosure.

The signal transmitting method provided by the embodiment of the present disclosure is as follows.

At step S201, in response to a receiving end being plugged into a destination end, a first high-speed signal optoelectronic transmission module acquires a power supply signal from a high-speed signal line.

Specifically, when the receiving end 1 (also shown in FIG. 1) is plugged into a display device 2, that is, when a high-speed signal line of the receiving end 1 is connected to a terminating power supply of the display device 2, the termination power supply supplies power to a power supply port A of the first high-speed signal optoelectronic transmission module 11 through the high-speed signal line.

At step S202, in response to the receiving end being plugged into the destination end, a first low-speed signal optoelectronic transmission module acquires a power supply signal from the high-speed signal line.

In some embodiments, a power supply port B of the first low-speed signal optoelectronic transmission module 12 is connected to the high-speed signal line through a power switch 13. In this case, in response to the receiving end 1 being plugged into the destination end (display device 2) and the power switch 13 being in a turned-on state, the first low-speed signal optoelectronic transmission module 12 acquires the power supply signal from the high-speed signal line. Accordingly, the power supply to the first low-speed signal optoelectronic transmission module 12 can be cut off by turning off the power switch 13, and energy consumption of the receiving end 1 can be saved without conducting signal transmitting by turning off the power switch 13.

It should be noted that although both the first high-speed signal optoelectronical transmission module 11 and the first low-speed signal optoelectronical transmission module 12 in this case acquire power supply through the high-speed signal line, if the first high-speed signal optoelectronical transmission module 11 does not transmit the high-speed signal, but in a standby mode, the power consumption required by the receiving end 1 in this state is lower. In other words, the power supply mode in this state means that the first high-speed signal optoelectronic transmission module 11 and the first low-speed signal optoelectronic transmission module 12 are ready for power supply of video transmission between the video source 3 and the display device 2, and can transmit the video once there is a demand for video transmission.

That is to say, the power consumption of the first high-speed signal optoelectronic transmission module 11 and the first low-speed signal optoelectronic transmission module 12 during video transmission is higher than that of the first high-speed signal optoelectronic transmission module 11 and the first low-speed signal optoelectronic transmission module 12 in the standby mode. A power supply situation of the receiving end 1 that is transmitting video is different from that of the receiving end that is ready for power supply, and the difference lies in the power consumption required by the receiving end.

It should be noted that the embodiment of the present disclosure has no strict restrictions on the sequence of step S201 and step S202. In actual signal transmitting process, step S201 and step S202 may be executed in parallel or successively.

At step S203, in response to the low-speed light signal, the first low-speed signal optoelectronic transmission module converts the low-speed light signal received from an optical fiber into a first low-speed electrical signal and transmits the first low-speed electrical signal to the destination end.

The low-speed light signal is obtained by converting the low-speed electrical signal of the video source 3 by the second low-speed signal optoelectronic transmission module 42 of the sending end 4. The second low-speed signal optoelectronic transmission module 42 transmits the low-speed light signal to a second optical fiber, and then transmits the low-speed light signal to the first low-speed signal optoelectronic transmission module 12 through the second optical fiber. The low-speed electrical signal of the video source 3 is the low-speed electrical signal received by the second low-speed signal optoelectronic transmission module 42 from the source when the sending end 4 is plugged into the source (video source 3).

At step S204, in response to the high-speed light signal, the first high-speed signal optoelectronical transmission module 11 converts the high-speed light signal received from the optical fiber into a first high-speed electrical signal and transmits the first high-speed electrical signal to the destination end.

The high-speed light signal is obtained by converting the high-speed electrical signal of the video source 3 by the second high-speed signal optoelectronic transmission module 41 of the sending end, and the second high-speed signal optoelectronic transmission module 41 transmits the high-speed light signal to the optical fiber, and then the optic fiber transmits the high-speed light signal to the first high-speed signal optoelectronic transmission module 11. The high-speed electrical signal of the video source 3 is the high-speed electrical signal received by the second high-speed signal optoelectronic transmission module 41 from the source when the sending end 4 is plugged into the source.

In order to adapt to the actual signal transmitting requirements, in some embodiments of the present disclosure, the power supply situation of the first low-speed signal optoelectronic transmission module 12 in the receiving end 1 can be controlled by controlling the power switch 13. Specifically, in this embodiment, the receiving end 1 further includes a controller 14 and the power switch 13. Accordingly, in the signal transmitting process, the controller 14 can control the power switch 13 to turn on, and the first low-speed signal optoelectronic transmission module 12 can obtain a power supply signal from the high-speed signal line. Accordingly, in the signal transmitting process, the controller 14 can also control the power switch 13 to turn off, and the high-speed signal line stops the power supply of the first low-speed signal optoelectronical transmission module 12.

The following describes a power supply control process of the receiving end with the controller and the power switch.

Figure 3:
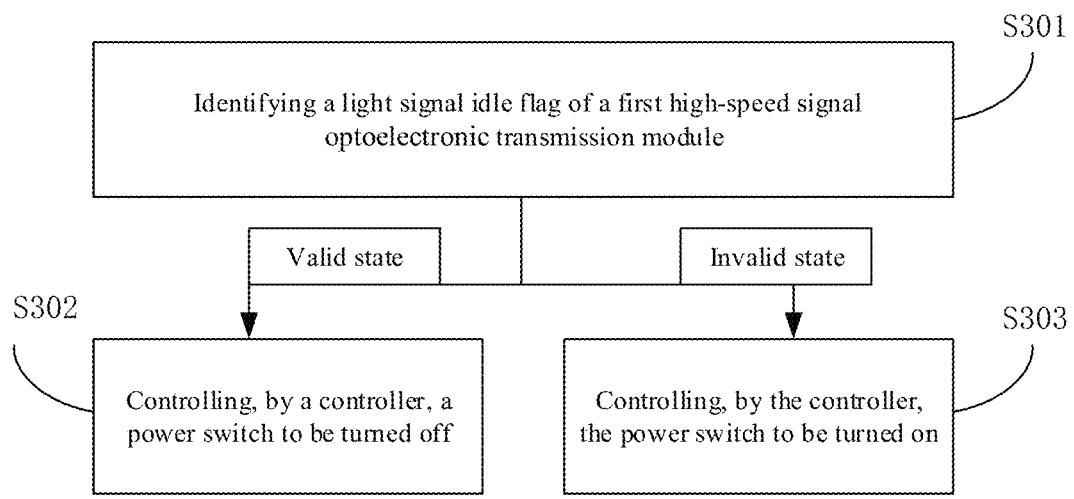
FIG. 3 illustrates a schematic flowchart of a power supply control process according to the embodiments of the present disclosure.

Referring to FIG. 3, FIG. 3 illustrates a schematic diagram of a power supply control process according to the embodiments of the present disclosure.

At step S301, a light signal idle flag of a first high-speed signal optoelectronic transmission module is identified.

If the light signal idle flag of the first high-speed signal optoelectronic transmission module 11 is in a valid state, step S302 is executed; otherwise, step S303 is executed.

In some embodiments, the light signal idle flag of the first high-speed signal optoelectronic transmission module 11 is distinguished by 0 and 1: when the light signal idle flag of the first high-speed signal optoelectronic transmission module 11 is in the valid state, the light signal idle flag is 1, which indicates that there is no demand for high-speed light signal transmission at present, so the power switch can be turned off to save energy consumption of the receiving end. When the light signal idle flag of the first high-speed signal optoelectronic transmission module 11 is in the invalid state, the light signal idle flag is 0, which indicates that there is demand for high-speed light signal transmission at present, that is, the high-speed signal line is in a non-idle state, and the power supply of the receiving end needs to be ensured, so the controller controls the power switch to be turned on.

Further, the light signal idle flag of the first high-speed signal optoelectronic transmission module 11 may be determined as follows:

when the first high-speed signal optoelectronic transmission module 11 does not receive a high-speed light signal for a preset time period, the first high-speed signal optoelectronic transmission module 11 sets the light signal idle flag thereof to the valid state; and when the first high-speed signal optoelectronic transmission module 11 receives a first preset high-speed light signal sent from the optical fiber, the first high-speed signal optoelectronic transmission module sets the light signal idle flag thereof to the invalid state; and when the first high-speed signal optoelectronic transmission module 11 receives a second preset high-speed light signal sent from the optical fiber, the first high-speed signal optoelectronic transmission module sets the light signal idle flag thereof to the invalid state.

A generation process of the first preset high-speed light signal is as follows: when the low-speed signal monitoring function of the second high-speed signal optoelectronic transmission module 41 of the sending end 4 monitors the low-speed electrical signal provided by the video source 3 on the low-speed data line, the second high-speed signal optoelectronic transmission module 41 generates the first preset high-speed electrical signal, and converts the first preset high-speed electrical signal into the first preset high-speed light signal and transmits the first preset high-speed light signal to the optical fiber.

A generation process of the second preset high-speed light signal is as follows: after the second high-speed signal optoelectronic transmission module 41 receives the second preset high-speed light signal transmitted by the source after being awakened, the second high-speed signal optoelectronic transmission module 41 converts the second preset high-speed light signal into the second preset high-speed electrical signal, and then transmits the second preset high-speed electrical signal to the optical fiber.

It can be understood that, in the embodiments of the present disclosure, regardless of whether the display device 2 and/or the video source 3 are in the dormant state, the first high-speed signal optoelectronic transmission module 11 of the receiving end 1 is always in the standby state, that is, the first high-speed signal optoelectronic transmission module 11 can always obtain the power supply signal from the high-speed signal line, to wake up the display device 2 when recognizing that it is about to receive high-speed signals, and restore a power supply capacity in time to meet signal transmitting requirements. In one embodiment, when the first high-speed signal optoelectronic transmission module 11 does not receive the high-speed light signal for the preset time period, it means that the display device 2 and/or the video source 3 are currently in the dormant state, and there is no signal transmitting requirement for the receiving end, then the power switch 13 is turned off to stop the power supply to the first low-speed signal optoelectronic transmission module 12, to avoid unnecessary power consumption.

It should be noted that the preset time period in this embodiment may be adjusted according to actual requirements, which are not uniquely limited herein.

At step S302, the controller controls the power switch to be turned off.

When the power switch 13 is turned off, the contact of the power switch 13 is disconnected from the high-speed signal line.

At step S303, the controller controls the power switch to be turned on.

After the controller 14 controls the power switch 13 to be turned on, the contact of the power switch 13 is connected to an electrical connection point VCM_RX on the high-speed signal line, and the termination power supply Avec supplies power to the first low-speed signal optoelectronic transmission module 12.

Further, in an actual signal transmitting process, when the video source 3 and/or the display device 2 are in the dormant state, the video source 3 and/or the display device 2 can be awakened in the following ways.

Figure 4:
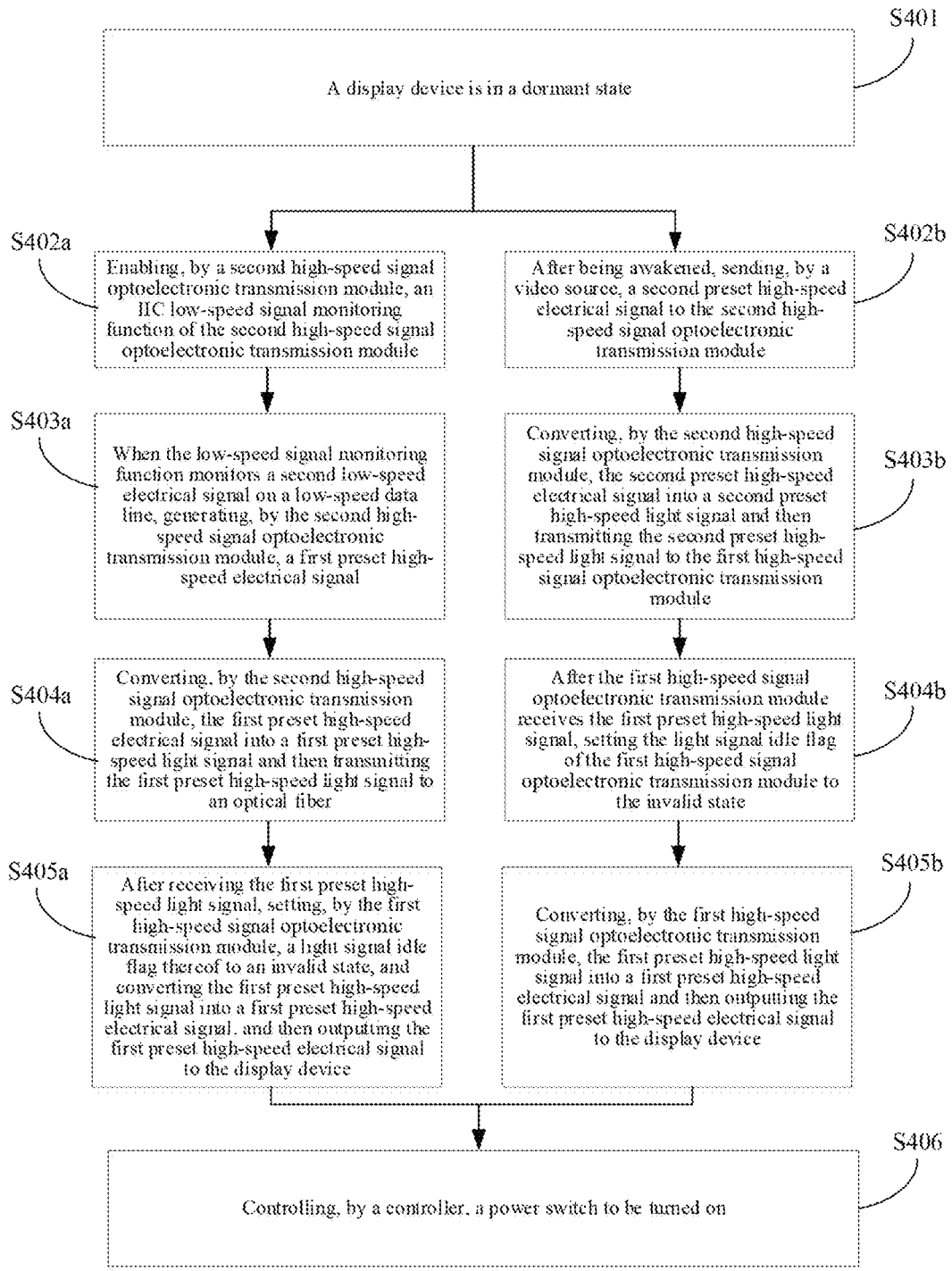
FIG. 4 illustrates a schematic flowchart of a wakeup method according to the embodiments of the present disclosure.

FIG. 4 shows a schematic flowchart of a wakeup method according to the embodiments of the present disclosure. Referring to FIG. 4, the wakeup method includes the following steps.

At step S401, the display device is in the dormant state.

For example, when an electrical signal idle flag of the second high-speed signal optoelectronic transmission module 41 is set to be 1, that is, is set to be in the valid state, it indicates that the power switch 13 is turned off and the video source 3 and/or the display device 2 are in the dormant state.

At step S402a, the second high-speed signal optoelectronic transmission module enables an IIC low-speed signal monitoring function of the second high-speed signal optoelectronic transmission module.

Specifically, when an electrical signal idle flag of the second high-speed signal optoelectronic transmission module 41 is set to be 1, the second high-speed signal optoelectronic transmission module 41 enables the IIC (Inter-Integrated Circuit bus) low-speed signal monitoring function of the second high-speed signal optoelectronic transmission module 41. The IIC low-speed signal monitoring function of the second high-speed signal optoelectronic transmission module 41 is turned on, which can monitor data transmitting on the low-speed signal line (for example, IIC bus) of the video source 3. The IIC low-speed signal monitoring function of the second high-speed signal optoelectronic transmission module 41 is turned on, which can monitor data transmitting on the low-speed signal line (for example, IIC bus) of the video source 3.

At step 403a, when the low-speed signal monitoring function monitors the low-speed electrical signal on the low-speed data line, the second high-speed signal optoelectronic transmission module 41 generates the first preset high-speed electrical signal.

At step 404a, the second high-speed signal optoelectronic transmission module 41 converts the first preset high-speed electrical signal into a first preset high-speed light signal and then transmits the first preset high-speed light signal to the optical fiber.

At step 405a, after receiving the first preset high-speed light signal, the first high-speed signal optoelectronic transmission module 11 sets the light signal idle flag thereof to the invalid state, and converts the first preset high-speed light signal into the first preset high-speed electrical signal, and then outputs the first preset high-speed electrical signal to the display device 2.

It should be noted that step 402a to step 405a illustrate a wake-up process of the signal transmitting system. In this process, after the video source 3 is awakened, the video source 3 sends a low-speed electrical signal to the second low-speed signal optoelectronic transmission module 42. When the IIC low-speed signal monitoring function of the second high-speed signal optoelectronic transmission module 41 detects that there is a low-speed electrical signal on an IIC data line, the second high-speed signal optoelectronic transmission module 41 generates and sends a first preset high-speed light signal to the first high-speed signal optoelectronic transmission module 11, and meanwhile, the second high-speed signal optoelectronic transmission module 41 switches to a normal transmission mode.

It should be noted that after the video source 3 is awakened, in order to realize the signal transmitting between the video source 3 and the display device 2, the video source 3 sends a low-speed electrical signal to the second low-speed signal optoelectronic transmission module 42 through the IIC data line. The low-speed electrical signal in this case may be the same as or different from the low-speed electrical signal mentioned above. Usually, for the convenience of configuration, the low-speed electrical signal in this case is the same as the low-speed electrical signal mentioned above.

It should be noted that when the video source 3 and the display device 2 are in the dormant state, the power switch 13 of the receiving end 1 is turned off, and the first low-speed signal optoelectronic transmission module 12 cannot be powered, and the low-speed electrical signal cannot be transmitted to the display device 2. Therefore, when the IIC low-speed signal monitoring function of the second high-speed signal optoelectronic transmission module 41 detects that there is a low-speed electric signal sent by the video source 3 on the IIC data line, the second high-speed signal optoelectronic transmission module 41 generates and sends the first preset high-speed light signal, which is sent to the first high-speed signal optoelectronic transmission module 11 through the optical fiber, and meanwhile, the second high-speed signal optoelectronic transmission module 41 is switched to the normal transmission mode, that is, the light signal idle flag of the second high-speed signal optoelectronic transmission module 41 is set to be 0. During actual application, an electro-optical conversion device such as a light emitting diode may be arranged in the second high-speed signal optoelectronic transmission module 41 to generate the first preset high-speed light signal, specifically, the first preset high-speed light signal can be generated under the drive of the first preset high-speed electrical signal.

It should be noted that the first preset high-speed light signal is not a valid video signal, but a high-speed light signal used to simulate high-speed video signals, which is configured to give the receiving end 1 and the display device 2 an indication that high-speed signal transmission is needed, to wake up the receiving end 1 and the display device 2. The first preset high-speed light signal usually has a short duration, and one form thereof may be flexibly designed as long as the first preset high-speed light signal can simulate high-speed video signals.

Specifically, in order to facilitate the normal transmission of subsequent low-speed signals, after the second high-speed signal optoelectronic transmission module 41 monitors the low-speed electrical signal, the second high-speed signal optoelectronic transmission module 41 configures the second low-speed signal optoelectronic transmission module 42 to be in the normal working mode. It should be noted that during actual application, a controller may be built into the second high-speed signal optoelectronic transmission module 41, and the controller configures the second low-speed signal optoelectronic transmission module 42 to be in the normal working mode.

At step 402b, after being awakened, the video source sends a second preset high-speed electrical signal to the second high-speed signal optoelectronic transmission module 41.

At step 403b, the second high-speed signal optoelectronic transmission module 41 converts the second preset high-speed electrical signal into a second preset high-speed light signal and then transmits the second preset high-speed light signal to the first high-speed signal optoelectronic transmission module 11.

At step 404b, after the first high-speed signal optoelectronic transmission module 11 receives the first preset high-speed light signal, the light signal idle flag of the first high-speed signal optoelectronic transmission module 11 is set to the invalid state.

At step 405b, the first high-speed signal optoelectronic transmission module 11 converts the first preset high-speed light signal into a first preset high-speed electrical signal and then outputs the first preset high-speed electrical signal to the display device.

It should be noted that 402b to step 405b illustrate a wake-up process of another signal transmitting system. In this process, after the video source 3 is awakened, in order to realize the signal transmitting between the video source 3 and the display device 2, the video source 3 sends a second preset high-speed electrical signal to the second high-speed signal optoelectronic transmission module 41. The second preset high-speed electrical signal may be the same as or different from the first preset high-speed electric signal mentioned above. Usually, for the convenience of configuration, the second preset high-speed electrical signal is the same as the first preset high-speed electrical signal.

It should be noted that when the second high-speed signal optoelectronic transmission module 41 receives the second preset high-speed electrical signal sent by the video source 3, the second high-speed signal optoelectronic transmission module 41 converts the second preset high-speed electrical signal into the second preset high-speed light signal, and the second preset high-speed light signal is sent to the first high-speed signal optoelectronic transmission module 11 via a pure-optical active cable. Meanwhile, the second high-speed signal optoelectronic transmission module 41 is switched to the normal transmission mode, that is, the light signal idle flag of the second high-speed signal optoelectronic transmission module 41 is set to be 0. After the first high-speed signal optoelectronic transmission module 11 receives the s second preset high-speed light signal sent by the second high-speed signal optoelectronic transmission module 41 through the optical fiber, the light signal idle flag of the first high-speed signal optoelectronic transmission module 11 is set to be 0, and the first high-speed signal optoelectronic transmission module 11 starts to work normally, which can realize normal signal transmitting. Meanwhile, the first high-speed signal optoelectronic transmission module 11 converts the second preset high-speed light signal into the second preset high-speed electrical signal and then transmits the second preset high-speed electrical signal to the display device 2.

In order to facilitate the normal transmission of subsequent low-speed signals, after the second high-speed signal optoelectronic transmission module 41 receives the second preset high-speed electrical signal sent by the video source 3, the second high-speed signal optoelectronic transmission module 41 may configure the second low-speed signal optoelectronic transmission module 42 to be in the normal working mode. During actual application, a controller may be built into the second high-speed signal optoelectronic transmission module 41, and the controller configures the second low-speed signal optoelectronic transmission module 42 to be in the normal working mode.

At step S406, the controller controls the power switch to be turned on.

The controller 14 controls the power switch 13 to be turned on, the first low-speed signal optoelectronic transmission module 12 is normally powered, and the first low-speed signal optoelectronic transmission module 12 starts to work normally.

It can be understood that the wakeup method provided by the embodiments of the present disclosure includes the following two wake-up ways.

The first way is that, after the video source 3 is awakened, a low-speed electrical signal may be sent first, and then the light signal idle flag of the first high-speed signal optoelectronic transmission module 11 is set to the invalid state through the steps 402a to 405a mentioned above.

The second way is that, after the video source 3 is awakened, a high-speed electrical signal may be sent first, and then the light signal idle flag of the first high-speed signal optoelectronic transmission module 11 is set to the invalid state through the steps 402b to 405b mentioned above.

When the display device 2 is in the dormant state, the power supply of the termination power supply voltage Avec of the display device is insufficient. In this case, the power switch 13 is turned off, and the first low-speed signal optoelectronic transmission module 12 at the receiving end is not powered. Accordingly, the low-speed electrical signal cannot be transmitted to the display device 2. The first high-speed signal optoelectronic transmission module 11 is powered by the termination power supply voltage Avec, and can receive the first preset high-speed light signal or the second preset high-speed light signal in a short time and generate a corresponding high-speed electrical signal and transmit the corresponding high-speed electrical signal to the display device, and the display device is awakened, and then the termination power supply voltage Avec of the display device 2 supplies power normally. Subsequently, the power switch 13 is turned on, and the first low-speed signal optoelectronic transmission module 12 at the receiving end is powered. Accordingly, the low-speed electrical signal of the video source 3 can be transmitted to the display device 2. Therefore, regardless of whether the video source first generates the first preset high-speed electrical signal or the low-speed electrical signal when being awakened, the pure-optical active cable according to the embodiments of the present application wakes up the display device 2 by outputting the first preset high-speed electrical signal to the display device 2. Even if the termination power supply voltage Avec of the display device 2 does not supply sufficient power in the dormant state, the power supply capacity will be restored after the display device 2 is awakened, and the receiving end of the pure-optical active cable can work normally and the display device can work normally.

The above embodiments have exemplified the application method of the receiving end of the pure-optical active cable provided by the present disclosure in signal transmitting. It should be understood that various alternatives to the embodiments of the present disclosure described herein can be adopted in the practice of the present disclosure.

The present disclosure also provides a pure-optical active cable based on any of the aforementioned receiving ends.

The pure-optical active cable is introduced below with reference to the pure-optical active cable and an application in signal transmitting thereof.

For the convenience of description, a structural schematic diagram of the pure-optical active cable shown in FIG. 5 will be described herein. FIG. 5 shows a schematic structural diagram of a pure-optical active cable in an embodiment of the present disclosure. Referring to FIG. 5, the pure-optical active cable includes: a receiving end 1, an optical fiber and a sending end 4.

The receiving end 1 includes: a first high-speed signal optoelectronic transmission module 11 and a first low-speed signal optoelectronic transmission module 12. A power supply port A of the first high-speed signal optoelectronic transmission module 11 connects to a high-speed signal line of the receiving end 1, and a power supply port B of the first low-speed signal optoelectronic transmission module 12 connects to the a high-speed signal line of the receiving end.

The sending end 4 includes: a second high-speed signal optoelectronic transmission module 41 and a second low-speed signal optoelectronic transmission module 42. The second high-speed signal optoelectronic transmission module 41 connects to the first high-speed signal optoelectronic transmission module 11 through the optical fiber, and the second low-speed signal optoelectronic transmission module 42 connects to the first low-speed signal optoelectronic transmission module 12 through a second optical fiber.

When the pure-optical active cable transmits signals, the sending end 4 connects to the source, and the receiving end 1 connects to a destination end, that is, the sending end 4 connects to a video source 3, and the receiving end 1 connects to a display device 2.

A power supply mode of the pure-optical active cable is as follows: the first high-speed signal optoelectronic transmission module 11 acquires power supply from the high-speed signal line of the receiving end, the first low-speed signal optoelectronic transmission module 12 acquires power supply from the high-speed signal line of the receiving end, and the second high-speed signal optoelectronic transmission module 41 and the second low-speed signal optoelectronic transmission module 42 respectively acquire electric power from the video source 3. For example, the video source 3 supplies power to the second high-speed signal optoelectronic transmission module 41 and the second low-speed signal optoelectronic transmission module 42 through a 5V power supply line and a ground wire GND. It should be noted that one power supply voltage is related to one signal transmitting system, and in other embodiments, the power supply voltage is not limited to 5 V.

A signal transmitting process of the pure-optical active cable is as follows: the second low-speed signal optoelectronic transmission module 42 converts a first low-speed electrical signal received from the video source 3 into a low-speed light signal and transmits the low-speed light signal to the first low-speed signal optoelectronic transmission module 12 through the second optical fiber. The first low-speed signal optoelectronic transmission module 12 converts the low-speed light signal into the first low-speed electrical signal and transmits the first low-speed electrical signal to the display device 2. The second high-speed signal optoelectronic transmission module 41 converts a high-speed electrical signal received from the video source 3 into a high-speed light signal and transmits the high-speed light signal to the first high-speed signal optoelectronic transmission module 11 through the optical fiber. The first high-speed signal optoelectronic transmission module 11 converts the high-speed light signal into a first high-speed electrical signal and transmits the first high-speed electrical signal to the display device 2.

Specifically, the video source 3 connects to the display device 2 through the sending end 4, the optical fiber and the receiving end 1 in sequence. The video source 3 may be a host for providing signals such as video signal, HPD signal, SCL signal, SDA signal, CEC signal and EDID signal. The sending end 4 may be an adapter connected with the video source 3, and the sending end 4 is configured for optoelectronically converting a video signal provided by the video source 3 to obtain a high-speed light signal and transmitting the high-speed light signal to the optical fiber, and optoelectronically converting the HPD signal, the SCL signal, the SDA signal, the CEC signal and the EDID signal provided by the video source 3 to obtain a low-speed light signal and transmitting the low-speed light signal to the optical fiber. In practical application, transmission protocols between the video source 3 and the sending end 4, and between the receiving end 1 and the display device 2 may be common audio and video transmission protocols such as a DVI protocol and an HDMI protocol.

It should be noted that the optical fiber is represented by a connecting line between the sending end 4 and the receiving end 1 in FIG. 5. In addition, in FIG. 5, connecting lines are drawn between the video source 3, the sending end 4, the receiving end 1 and the display device 2, and these connecting lines represent connecting lines for transmitting different content or speed signals. In practical application, the connecting lines between the video source 3 and the sending end 4 are all concentrated on one connector, and the connecting lines between the receiving end 1 and the display device 2 are also concentrated on one connector. Understandably, the pure-optical active cable includes one or more optical fibers, and the high-speed light signal and the low-speed light signal are transmitted on the same or different optical fibers.

Referring to FIG. 5 continuously, the receiving end 1 may further include: a power switch 13 and a controller 14. The controller 14 is configured for controlling the power switch 13 to turn on, and the first low-speed signal optoelectronic transmission module 12 can acquire electric power from the high-speed signal line.

For example, when the display device 2 is in a dormant state, the power switch 13 is turned off. In this case, only the power supply port of the first high-speed signal optoelectronic transmission module 11 connects to the high-speed signal line of the receiving end 1, and the first high-speed signal optoelectronic transmission module 11 is in a standby state, while the first low-speed signal optoelectronic transmission module 12 stops supplying power to reduce power consumption of the receiving end.

Further, when the first high-speed signal optoelectronic transmission module 11 does not receive a high-speed light signal for a preset time period, the first high-speed signal optoelectronic transmission module 11 sets a light signal idle flag thereof to a valid state, and determines that the display device 2 is in the sleep mode, and the controller 14 controls the power switch 13 to turn off.

When the display device is in the dormant state, the display device can be awakened in the following ways. In this case, the controller 14 controls the power switch 13 to turn on, and the first low-speed signal optoelectronic transmission module 12 can acquire electric power from the high-speed signal line.

Specifically, when the second high-speed signal optoelectronic transmission module 41 recognizes that the source enters the dormant state, the second high-speed signal optoelectronic transmission module 41 sets an electrical signal idle flag thereof to a valid state and stops sending a high-speed light signal to the first high-speed signal optoelectronic transmission module 11. The second high-speed signal optoelectronic transmission module 41 enables a low-speed signal monitoring function of the second high-speed signal optoelectronic transmission module 41. When the low-speed signal monitoring function of the second high-speed signal optoelectronic transmission module 41 monitors a second low-speed electrical signal on the low-speed data line, the second high-speed signal optoelectronic transmission module generates a first preset high-speed electrical signal, and converts the first preset high-speed electrical signal into a first preset high-speed light signal and transmits the first preset high-speed light signal to the optical fiber. The second high-speed signal optoelectronic transmission module 41 is converted to a normal transmission mode, and the second high-speed signal optoelectronic transmission module 41 configures the second low-speed signal optoelectronic transmission module 42 to be in a normal working mode. After the first high-speed signal optoelectronic transmission module 11 receives the first preset high-speed light signal transmitted from the optical fiber, the first high-speed signal optoelectronic transmission module sets the light signal idle flag thereof to the invalid state, and converts the first preset high-speed light signal into the first preset high-speed electrical signal, and then outputs the first preset high-speed electrical signal to the destination end. When the light signal idle flag of the first high-speed signal optoelectronic transmission module 11 is set into the invalid state, the controller 14 controls the power switch 13 to turn on, the power supply of the first low-speed signal optoelectronic transmission module 12 becomes normal, and the first low-speed signal optoelectronic transmission module 12 starts working normally.

In another situation, when the display device 2 is in the dormant state, the display device can be awakened in the following ways. In this case, the controller 14 controls the power switch 13 to turn on, and the first low-speed signal optoelectronic transmission module 12 can acquire electric power from the high-speed signal line of the receiving end 1.

Specifically, after the second high-speed signal optoelectronic transmission module 41 receives a second preset high-speed electrical signal transmitted from the video source after being awakened, the second high-speed signal optoelectronic transmission module 41 converts the second preset high-speed electrical signal into a second preset high-speed light signal, and then outputs the second preset high-speed light signal to the optical fiber, and the second high-speed signal optoelectronic transmission module 41 is converted to a normal transmission mode. After receiving the second preset high-speed light signal transmitted from the optical fiber, the first high-speed signal optoelectronic transmission module 11 sets the light signal idle flag thereof to the invalid state, and converts the second preset high-speed light signal into the second preset high-speed electrical signal, and then outputs the second preset high-speed electrical signal to the destination end. When the light signal idle flag of the first high-speed signal optoelectronic transmission module 11 is set to be the invalid state, the controller 14 controls the power switch 13 to turn on, the power supply of the low-speed signal optoelectronic transmission module 12 becomes normal, the first low-speed signal optoelectronic transmission module 12 starts working normally, and the second high-speed signal optoelectronic transmission module 41 configures the second low-speed signal optoelectronic transmission module 42 to be in a normal working mode.

It should be noted that the method of controlling the power switch 13 to turn on and the first low-speed signal optoelectronic transmission module 12 can acquire electric power from the high-speed signal line has been described in detail in the embodiments according to FIG. 4, and the detailed description is not repeated here.

The present disclosure also provides a pure-optical active cable. On the basis of any pure-optical active cable mentioned above, the pure-optical active cable of the embodiment of the present disclosure further includes: an adapter and a connector; the second high-speed signal optoelectronic transmission module 41 connects to the first high-speed signal optoelectronic transmission module 11 through the optical fiber after passing through at least one section of adapting optical fiber, and the second low-speed signal optoelectronic transmission module 42 connects to the first low-speed signal optoelectronic transmission module 12 through the optical fiber after passing through the at least one section of adapting optical fiber; and all sections of adapting optical fibers are connected in sequence, and switching between two adjacent optical fibers is realized by setting adapters at ends of two optical fibers to be connected and inserting the adapters into connectors.

Because a transmission medium of the pure-optical active cable is optical fiber, for some active cables, a 5V voltage signal provided by the source is not transmitted from the source to the receiving end by the active cables.

For a display device supporting a Non-Link Recoverable Off state, in the dormant state, if a power input Pin (Pin) of an HDMI interface of the display device does not acquire the 5V voltage signal, the display device will always be in the dormant state, and there may be a compatibility problem that the display device cannot be lit after being connected with the pure-optical AOC. When attempting to wake up the display device, the source will send out a 5V voltage signal, but the active cable connecting the source and the display device may not transmit the 5V voltage signal sent by the source to the power input pin of the HDMI interface of the display device, and causes the display device in A Non-Link Recoverable Off state to be always in the dormant state since the 5V signal is not received all the time.

In view of this, it is urgent to provide a solution for signal transmitting, to solve a compatibility problem with display devices supporting the Non-Link Recoverable Off state in the process of multimedia signal transmitting in various application scenes such as plugging, dormancy and wake-up.

The embodiment of the present disclosure provides a solution applied to signal transmitting, which acquires a voltage signal from other than a signal sending end of a repeater, and transmits the voltage signal to a first voltage output end used for connecting a signal receiving end through the repeater, to provide a voltage signal for an interface in the signal receiving end for receiving multimedia signals, thus effectively solving a power supply compatibility problem in a multimedia signal transmission process.

Figure 6:
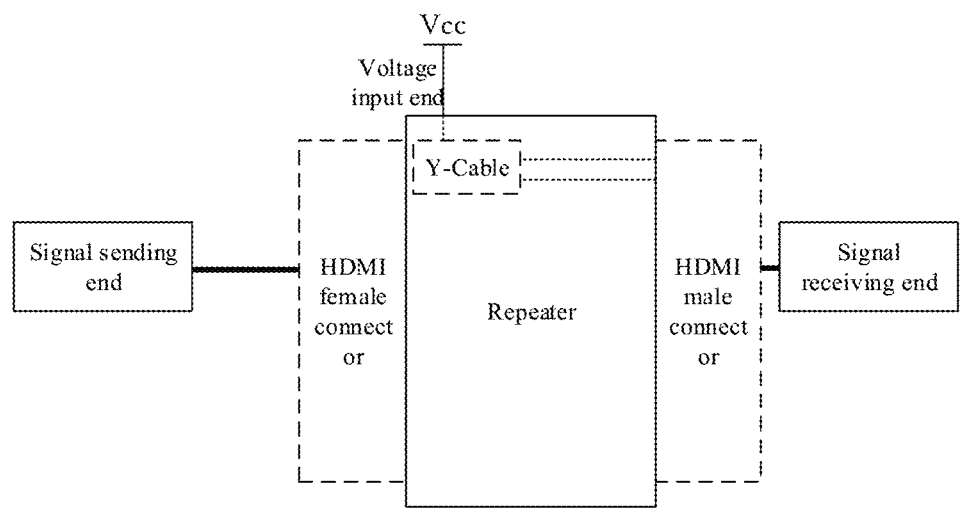
FIG. 6 illustrates a schematic structural diagram of a repeater according to some embodiments of the present disclosure.

FIG. 6 shows a schematic structural diagram of a repeater 600 according to some embodiments of the present disclosure. As shown in FIG. 6, the repeater is configured for connecting a signal sending end and a signal receiving end to transmit a signal sent from the signal sending end to the signal receiving end. The signal receiving end, for example, is a sink. In some embodiments, the signal receiving end is a display device, and the repeater transmits the received signal to the display device. Further, the repeater connects to the signal receiving end through a high-speed signal line and a low-speed signal line, and the high-speed signal line transmits high-speed signals including audio signals and/or video signals received from the signal sending end, and the low-speed signal line transmits low-speed signals received from the signal sending end. Both the high-speed signals and the low-speed signals are data meeting an HDMI protocol, for example. For example, both the high-speed signal line and the low-speed signal line connected between the repeater and the signal receiving end are made of copper wires, and both the high-speed signal and the low-speed signal are electric signals transmitted through the copper wires.

The repeater includes a voltage input end and a voltage output end. The voltage input end is configured for receiving a voltage signal from other than the signal sending end. The voltage output end includes a first voltage output end for connecting the signal receiving end, and the repeater is configured for outputting the received voltage signal to the first voltage output end. In some embodiments, the voltage signal may come from the signal receiving end or an external power supply. It should be noted that when the repeater receives a voltage signal from the signal receiving end, interfaces corresponding to interfaces of the voltage input end and the first voltage output end of the repeater are different interfaces (for example, USB interfaces on the signal receiving end). In application, when accessing the display device supporting the Non-Link Recoverable off state which requires a 5V voltage signal Vcc to wake up, the voltage input end of the repeater may acquire the 5V voltage signal Vcc from the display device or the external power supply and forward the 5V voltage signal Vcc to the HDMI interface of the display device through the first voltage output end, to make the display device quit the Non-Link Recoverable off state or wake up the display device.

The repeater can connect a sink end connector of the pure-optical active cable that does not transmit the 5V voltage signal with the display device, and even if the 5V voltage signal provided by the source is not transmitted from the source to the receiving end by the pure-optical active cable, the repeater can still forward the 5V voltage signal acquired from the display device or the external power supply to the HDMI interface of the display device through the first voltage output end, to make the display device quit the Non-Link Recoverable off state or wake up the display device. In some embodiments, the repeater shown in FIG. 6 may further include: an HDMI female connector, an HDMI male connector and a Y-Cable. The HDMI female connector is configured for connecting the signal sending end. The HDMI male connector is configured for connecting the signal receiving end. The Y-Cable includes a first connector. The voltage input end of the repeater is a power input pin of the first connector, the first voltage output end of the repeater is a power output pin of the HDMI male connector, and the power input pin of the first connector connects to the power output pin of the HDMI male connector.

It should be noted that other types of connector, including but not limited to Type-C, Digital Visual Interface (DVI) and Video Graphics Array (VGA) connectors, may be used as the connector for connecting the signal sending end. Unless otherwise specified, the HDMI connector mentioned later is an HDMI male connector. The first connector includes but is not limited to a 2-core power supply plug, a 3-core power plug, a multi-core power plug, a USB connector and an aviation plug.

Figure 7:
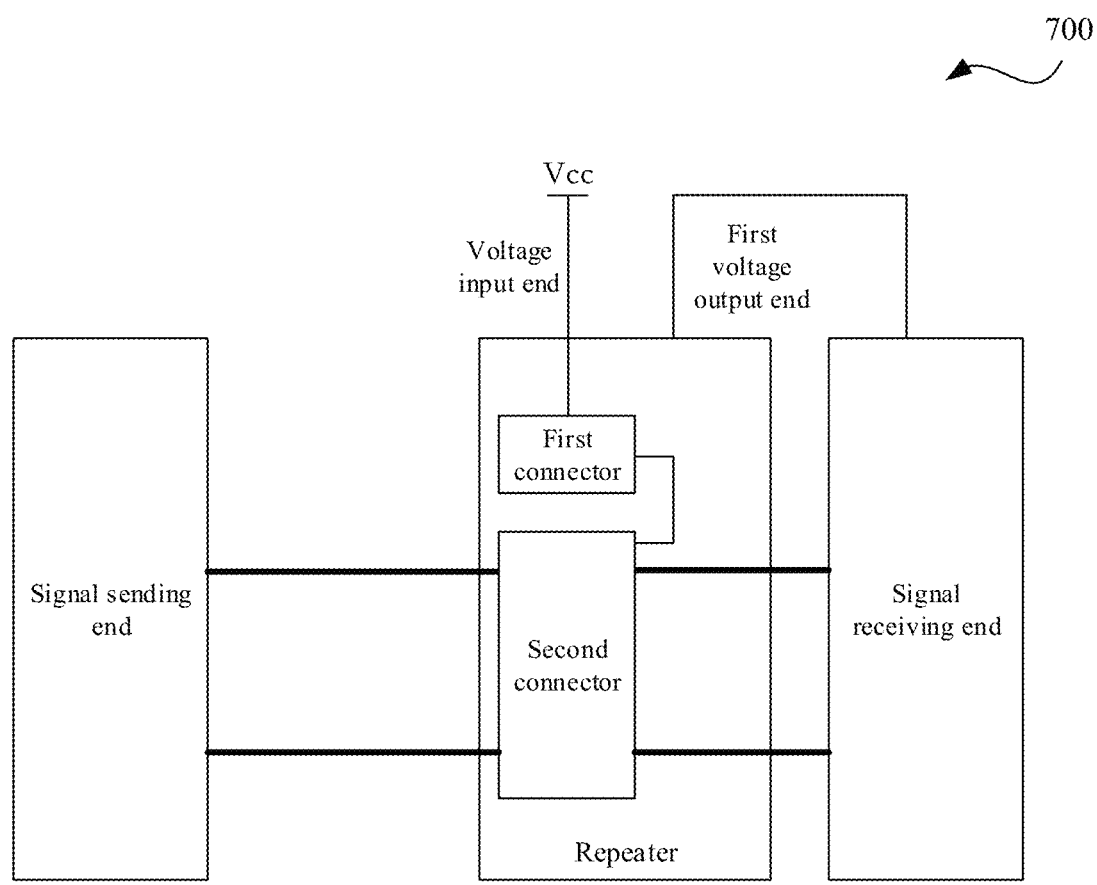
FIG. 7 illustrates a schematic structural diagram of a repeater according to another embodiments of the present disclosure.

Further, FIG. 7 illustrates a schematic structural diagram of a repeater 700 according to some other embodiments of the present disclosure. As shown in FIG. 7, the first voltage output end of the repeater is located in the HDMI connector, and the repeater connects to the display device serving as the signal receiving end through the connector. Specifically, the first voltage output end of the repeater is power output pin of the HDMI connector, and the voltage signal Vcc is transmitted to the signal receiving end through the power output pin of the HDMI connector, to lighten the display device from the dormant state.

In some embodiments, the voltage input end of the repeater includes a first connector. An input end of the first connector is configured for receiving a voltage signal from other than the signal sending end. Further, the repeater the repeater includes a second connector for connecting the signal sending end, the second connector connects to the high-speed signal line of the repeater, and the high-speed signal line of the repeater connects to the high-speed signal line of the signal sending end through the second connector, and the high-speed signal line of the repeater also connects to the high-speed signal line of the signal receiving end, and the high-speed signal from the signal sending end can be transmitted to the high-speed signal line of the repeater through the second connector and further transmitted to the signal receiving end. The second connector is also connected with the first connector. Specifically, the second connector can acquire a voltage signal from the repeater to transmit the voltage signal received by the first connector to the signal sending end. Alternatively, the second connector can also transmit the voltage signal from the signal sending end to the signal receiving end through a voltage input pin thereof.

Still further, the power input pin of the first connector is also connected with the power output pin of the HDMI connector. Specifically, in practical application, after the first connector receives the voltage signal Vcc from other than the signal sending end, the first connector transmits the voltage signal to the power output pin of the HDMI connector through the power input pin of the first connector, to provide a 5V voltage signal for the signal receiving end.

Figure 8:
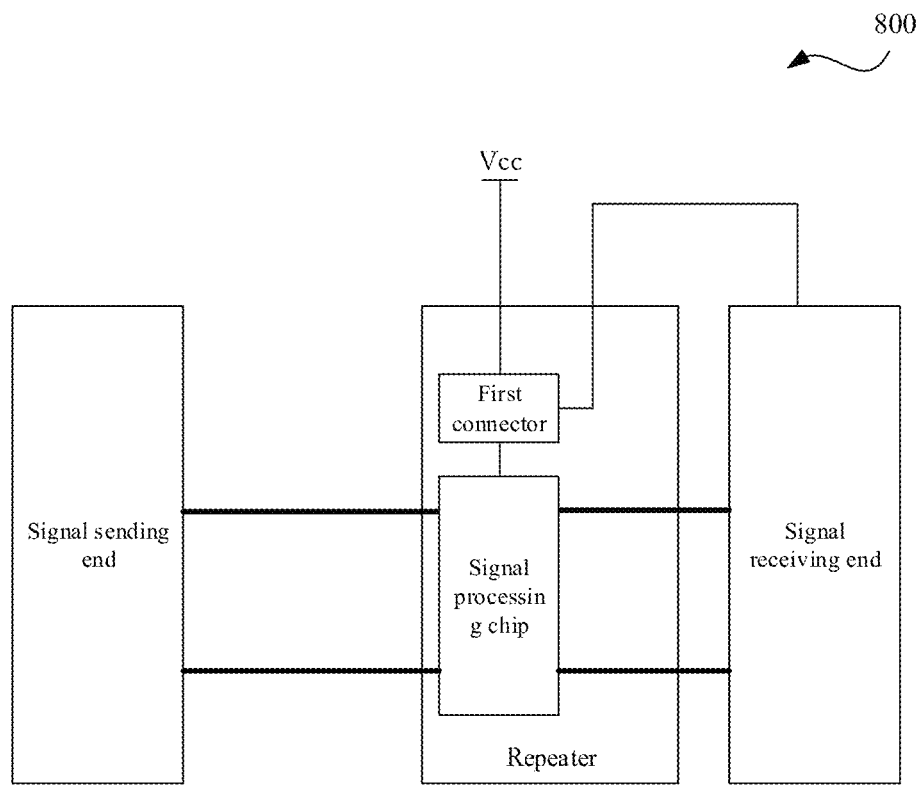
FIG. 8 illustrates a schematic structural diagram of a repeater according to still other embodiments of the present disclosure.

Based on the repeater shown in any of the previous embodiments, FIG. 8 illustrates a schematic structural diagram of a repeater 800 according to some other embodiments of the present disclosure. As shown in FIG. 8, the repeater further includes a signal processing chip, and the signal processing chip is configured for forwarding a high-speed signal and/or a low-speed signal from the signal sending end to the signal receiving end. Specifically, the signal processing chip is configured for signal enhancement of the input high-speed signal and/or low-speed signal, to increase a transmission distance and a transmission quality of signals. In practical application, a Redriver type chip and/or a Repeater type chip may be used as the signal processing chip.

Alternatively, the repeater according to the embodiments of the present application may not include a signal processing chip, and directly transmit a high-speed signal from the signal sending end to the signal receiving end through a high-speed signal line, and directly transmit a low-speed signal from the signal sending end to the signal receiving end through a low-speed signal line.

In some embodiments, as shown in FIG. 8, a number of the signal processing chip may be one, and an input end of the signal processing chip is respectively accessed to the high-speed signal line and the low-speed signal line of the signal sending end, and an output end of the signal processing chip is respectively accessed to the high-speed signal line and the low-speed signal line of the repeater. In some other embodiments, two signal processing chips may also be employed, and an input end of one signal processing chip connects to the high-speed signal line of the signal sending end for enhancing the high-speed signal, and an input end of the other signal processing chip connects to the low-speed signal line of the signal sending end for enhancing the low-speed signal. In other embodiments, one signal processing chip is employed for only enhancing the high-speed signal from the signal sending end and then providing the high-speed signal to the signal receiving end, while the low-speed signal from the signal sending end is directly transmitted to the signal receiving end through the low-speed signal line.

Further, the signal processing chip is also connected with the first connector. After receiving the voltage signal from other than the signal sending end, the first connector outputs the received voltage signal to the signal processing chip, to supply power to the signal processing chip.

In some embodiments, whether the voltage signal Vcc acquired by the first connector is transmitted to the signal receiving end can be controlled by a controller and a switch, to realize the dormancy and wake-up of the display device supporting the Non-Link Recoverable Off state, to reduce the power consumption of the system. To assist understanding, FIG. 9 of the present disclosure illustrates a schematic structural diagram of a repeater 900 according to some other embodiments of the present disclosure. Alternatively, the repeater shown in FIG. 6 to FIG. 8 may further include a controller and a switch, and an output end of the controller connects to a control end of the switch, and the controller sends a turning-on instruction or a turning-off instruction to a control end of the switch through the output end to control the switch to be turned on or off. In other embodiments, the repeater shown in FIG. 6 to FIG. 8 does not include a controller and a switch.

Figure 9:
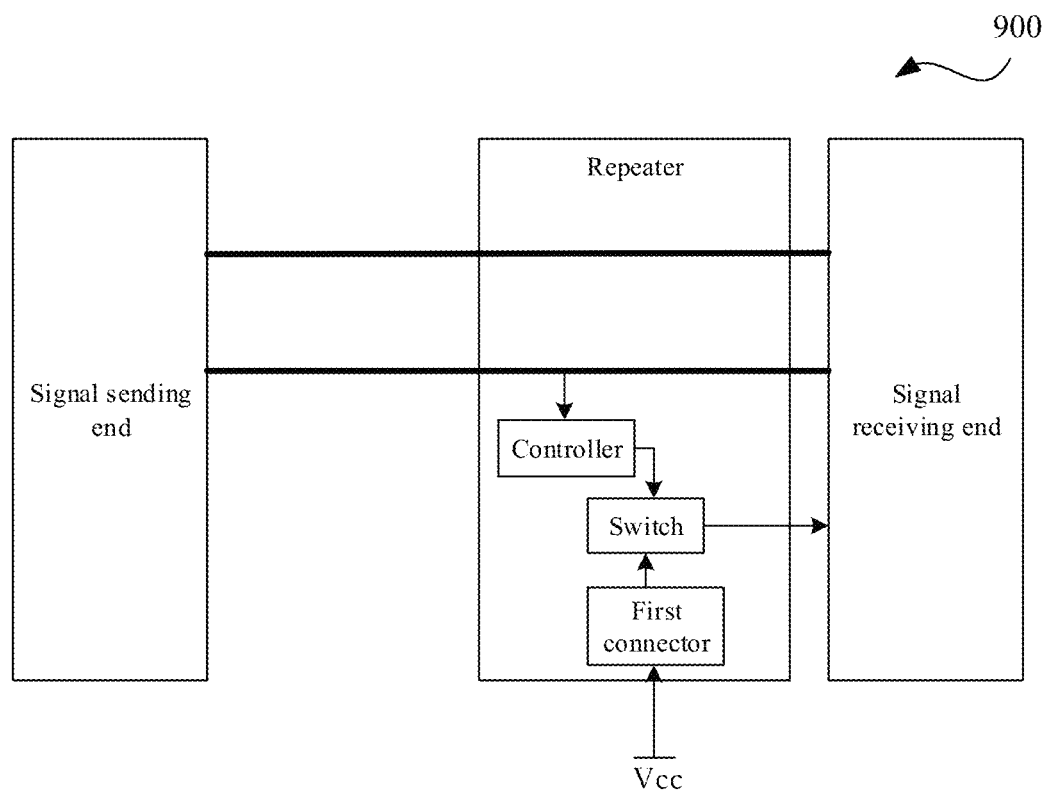
FIG. 9 illustrates a schematic structural diagram of a repeater according to another embodiments of the present disclosure.

Continuously referring to FIG. 9, one input end of the switch connects to the power input pin of the first connector, and the output end of the switch connects to the power output pin of the HDMI connector of the repeater. The step of controlling the switch to be turned on or off by the controller specifically includes: in response to that the repeater receives the signal from the signal sending end, controlling, by the controller, the switch to be turned on or off.

Illustratively, one input end of the controller is connected to the low-speed signal line for detecting whether one message appears on the low-speed signal line. When the specific message is detected, the switch is turned on, and the voltage input end of the first connector connects to the first voltage output end of the repeater, and the 5V voltage signal Vcc acquired from the voltage input end of the first connector can be transmitted to the display device via the power output pin of the HDMI connector, and the display device is awakened. When the specific message is not detected, the switch is turned off, and the voltage input end of the first connector is disconnected from the first voltage output end, and the 5V voltage signal Vcc cannot affect a working state of the display device. By setting the controller and the switch, the source or a plug of the active cable connected with the source can control whether to control the working state of the display device by means of the 5V voltage signal acquired from the voltage input end of the first connector by transmitting the specific message.

Figure 10:
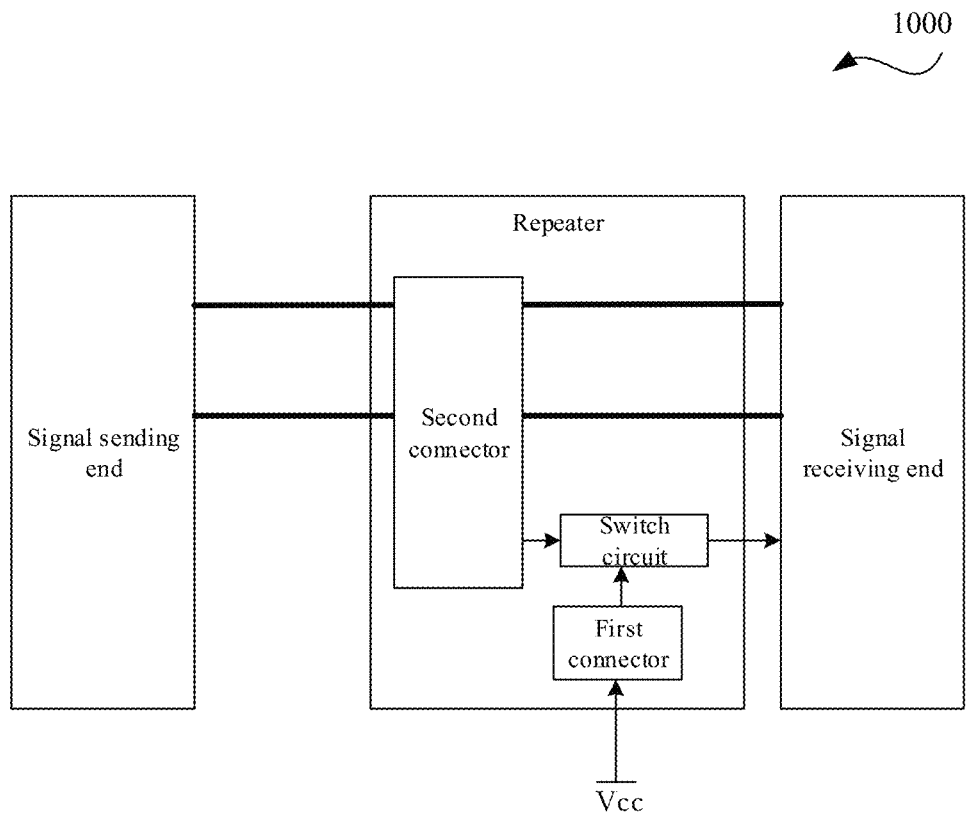
FIG. 10 illustrates a schematic structural diagram of a repeater according to still other embodiments of the present disclosure.

In some other embodiments, the repeater may also include a switch circuit. To assist understanding, FIG. 10 of the present disclosure illustrates a schematic structural diagram of a repeater 1000 according to some other embodiments of the present disclosure. As shown in FIG. 10, the switch circuit includes two inputs ends (i.e., a first input end and a second input end). The second connector includes a voltage input pin. A first input end of the switch circuit connects to a voltage input pin of the second connector, a second input end of the switch circuit connects to the power input pin of the first connector, and an output end of the switch circuit connects to the power output pin of the HDMI connector. Based on the above connection structure, the switch circuit can detect the voltage signal of the voltage input pin of the second connector, determine whether the voltage signal exists, and transmit the voltage signal from the first connector or the voltage signal from the second connector to the signal receiving end according to a determination result.

Specifically, an operation process of the switch circuit is as follows: as the first input end of the switch circuit connects to the voltage input pin of the second connector, the switch circuit can detect the voltage signal of the voltage input pin of the second connector. When a voltage signal of the voltage input pin of the second connector is greater than or equal to a first threshold, it means that the signal sending end provides a 5V voltage signal. In this case, the display device supporting the Non-Link Recoverable off state can be awakened without acquiring the 5V voltage signal from the beyond, so the switch circuit connects the first input end of the switch circuit with the output end of the switch circuit, and the display device can be awakened by acquiring the 5V voltage signal from the signal sending end directly through the second connector. When the voltage signal of the voltage input pin of the second connector is less than the first threshold, and the signal sending end does not provide the 5V voltage signal or the voltage signal provided by the signal sending end is insufficient to wake up the display device, the switch circuit connects the second input end of the switch circuit with the output end of the switch circuit, and the switch circuit can transmit the 5V voltage signal acquired by the first connector to the signal receiving end.

The repeater according to the embodiments of the present application cannot only connect a sink end connector of an active cable that does not transmit a 5V voltage signal with the display device, but also connect a sink end connector of an ordinary cable that transmits a 5V voltage signal with the display device. The switch circuit identifies whether the sink end connector of the cable outputs a valid 5V voltage signal, to select whether the 5V voltage signal provided by the sink end connector or the 5V voltage signal from the first connector is provided to the signal receiving end. Therefore, the repeater according to the embodiments of the present application may be suitable for or compatible with more types of cables, and is not limited to being used with active cables.

Based on the repeater shown in any of the previous embodiments, the present disclosure provides a receiving end plug, which includes the repeater according to any of the previous embodiments. Alternatively, the repeater may be detachably connected with the receiving end plug through an adapter, or may be integrated inside the receiving end plug.

In some signal transmitting solutions, the signal sent by the source is transmitted in the cable in the form of light signal. Before the signal is transmitted to the signal receiving end, the signal needs to be converted from the light signal form to an electrical signal form, and then can be identified by the display device serving as the signal receiving end. In practical application, a optoelectronic transmission module is usually used to complete conversion between the light signal and the electrical signal. For the normal operation of the optoelectronic transmission module, it is necessary to input a voltage to a power supply port of the optoelectronic transmission module to realize power supply to the optoelectronic transmission module.

In one embodiment, the repeater according to the embodiments of the present application may be used in cooperation with the receiving ends of various embodiments of the present application provided in FIG. 1 to FIG. 5. In some embodiments, the repeater according to the embodiments of the present application connects to the receiving end provided in FIG. 1 to FIG. 5. The receiving end is connected to the display device through the repeater. The high-speed signal line of the display device connects to the high-speed signal line of the repeater, and the high-speed signal line of the receiving end connects to the high-speed signal line of the repeater. Therefore, the electric power provided by the termination power supply of the display device is provided to the first high-speed signal optoelectronic transmission module and the first low-speed signal optoelectronic transmission module of the receiving end through the high-speed signal line of the repeater and the high-speed signal line at the receiving end. The electric power acquired by the repeater from the power input end thereof may also be provided to the first high-speed signal optoelectronic transmission module and the first low-speed signal optoelectronic transmission module of the receiving end through the high-speed signal line of the repeater and the high-speed signal line of the receiving end, thus strengthening the power supply to the receiving end.

Figure 11:
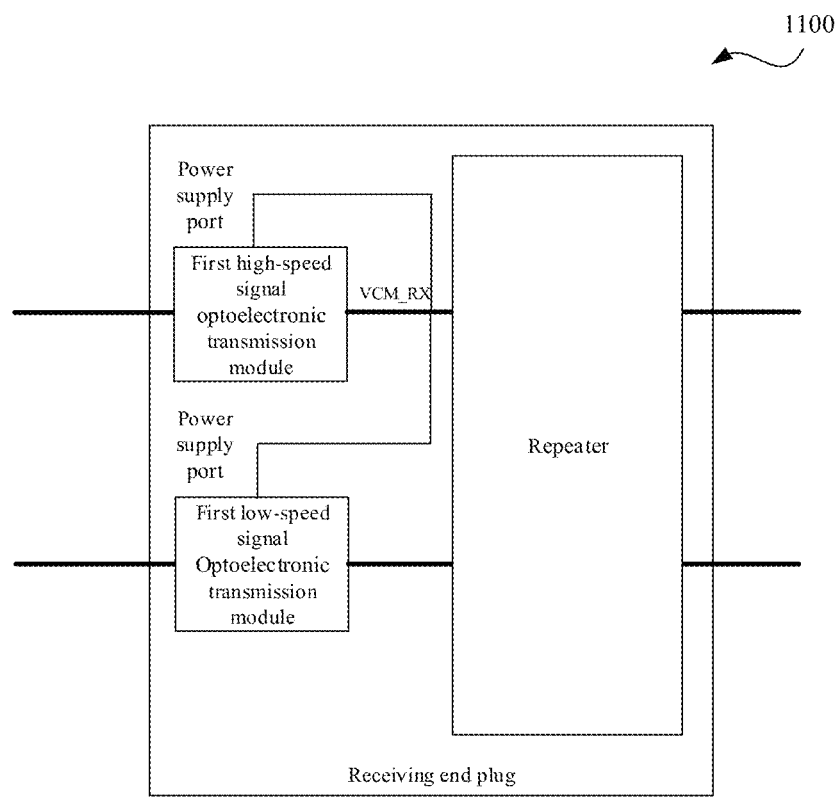
FIG. 11 illustrates a schematic structural diagram of a receiving end plug according to some embodiments of the present disclosure.
Figure 12:
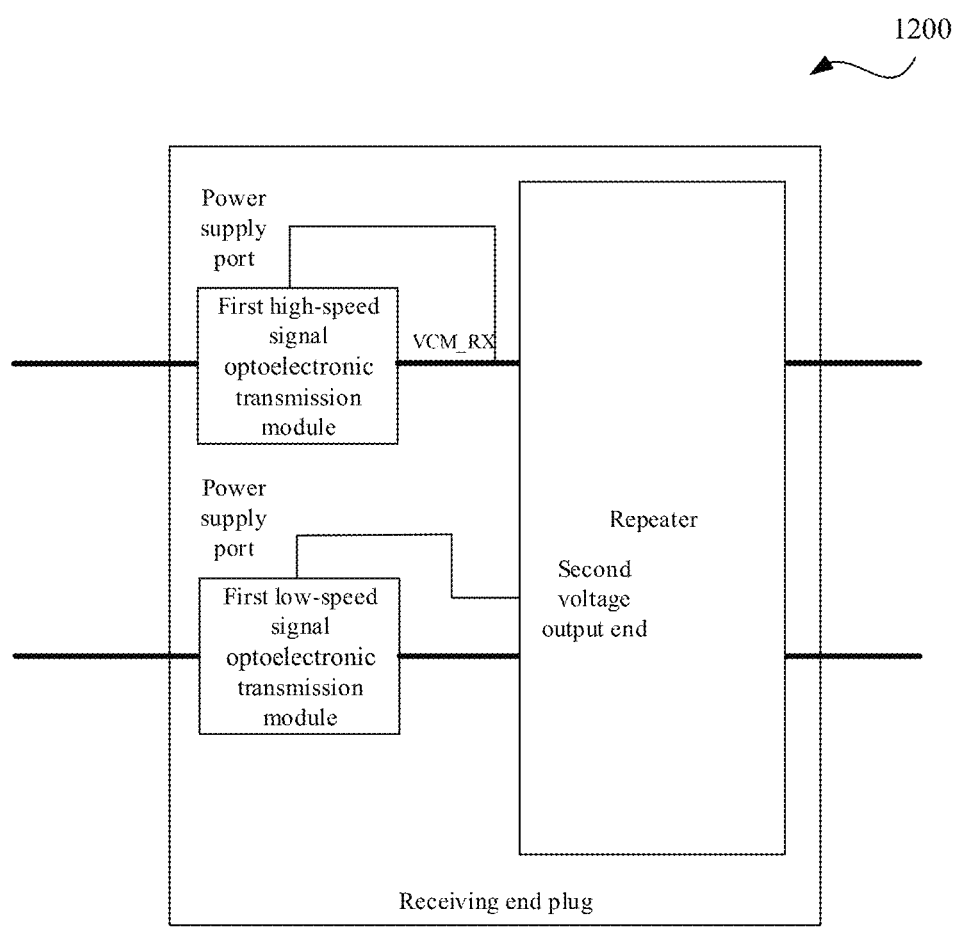
FIG. 12 illustrates a schematic structural diagram of a receiving end plug according to another embodiments of the present disclosure.
Figure 13:
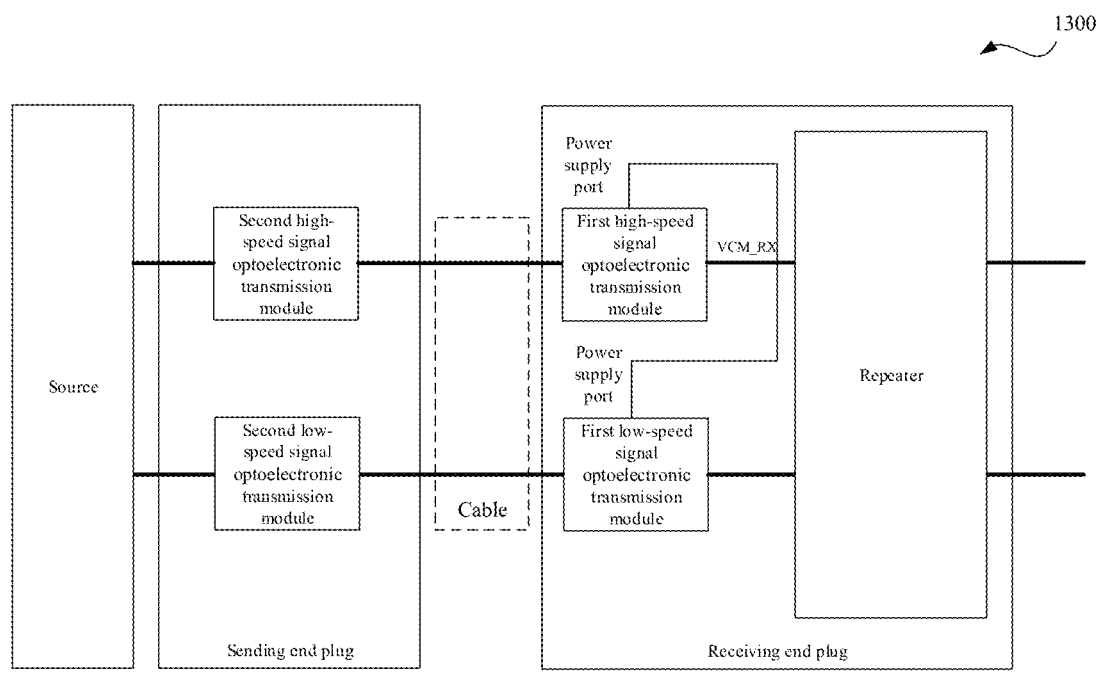
FIG. 13 illustrates a schematic structural diagram of an active cable according to some embodiments of the present disclosure.

In still other embodiments, receiving end plugs shown in FIG. 11 to FIG. 13 may be used as the receiving ends of various embodiments of the present application provided in FIG. 1 to FIG. 5, and the sending end plug shown in FIG. 13 may be used as the sending ends of various embodiments of the present application provided in FIG. 1 to FIG. 5.

The optoelectronic transmission module including the receiving end plug of the repeater can still get power from the high-speed signal line connected thereto.

FIG. 11 shows a schematic structural diagram of a receiving end plug 1100 according to some embodiments of the present disclosure. As shown in FIG. 11, the receiving end plug may also include: a first high-speed signal optoelectronic transmission module and a first low-speed signal optoelectronic transmission module, and the first high-speed signal optoelectronic transmission module is configured for converting a high-speed signal on a high-speed signal line from a light signal form to an electrical signal form, and the first low-speed signal optoelectronic transmission module is configured for converting a low-speed signal on a low-speed signal line from a light signal form to an electrical signal form.

Because the first high-speed signal optoelectronic transmission module and the first low-speed signal optoelectronic transmission module needs to be driven by a voltage signal to work normally, in this embodiment, a power supply port of the first high-speed signal optoelectronic transmission module is connected to a high-speed signal line between the first high-speed signal optoelectronic transmission module and the repeater to obtain electric power from the high-speed signal line. Specifically, the power supply port of the first high-speed signal optoelectronic transmission module may be connected to an electrical connection point VCM_RX on the high-speed signal line between the first high-speed signal optoelectronic transmission module and the repeater.

On the basis of the repeater shown in any of the previous embodiments, the repeater further includes a voltage converting circuit. An input end of the voltage converting circuit is configured for receiving the voltage signal input by the first connector, and an output end of the voltage converting circuit is connected to a high-speed signal line between the first high-speed signal optoelectronic transmission module and the repeater through a magnetic bead. The high-speed signal line can be pulled up to the voltage signal provided by the output end of the voltage converting circuit through a magnetic bead to further strengthen the power supply, to ensure the normal power supply of the optoelectronic transmission module and the normal transmission of high-speed signals and low-speed signals. In practical application, a 3.3V voltage signal is usually used to strengthen power supply. In this embodiment, when the same external power supply or display device is configured to supply power to the optoelectronic transmission module and an HDMI voltage output end at the same time, because voltages required by the two are different, it is necessary to use the voltage converting circuit to convert a 5V voltage signal into a 3.3V voltage signal, and then access the 3.3V voltage signal to the high-speed signal line between the first high-speed signal optoelectronic transmission module and the repeater.

Specifically, the power input pin of the first connector is respectively connected with the input end of the voltage converting circuit and the power output pin of the HDMI connector, and one 5V voltage signal is transmitted to the signal receiving end through the power output pin of the HDMI connector, and another 5V voltage signal is reduced in the voltage converting circuit to form a 3.3V voltage signal, which is output to the high-speed signal line between the first high-speed signal optoelectronic transmission module and the repeater.

In one way of taking electric power from the first low-speed signal optoelectronic transmission module, the power supply port of the first low-speed signal optoelectronic transmission module connects to the high-speed signal line between the first high-speed signal optoelectronic transmission module and the repeater. Further, the power supply port of the first high-speed signal optoelectronic transmission module may be connected to the same electrical connection point VCM_RX as the power supply port of the first high-speed signal optoelectronic transmission module.

In order to facilitate the explanation of another power-taking mode of the first low-speed signal optoelectronic transmission module, FIG. 12 illustrates a schematic structural diagram of a receiving end plug 1200 according to some other embodiments of the present disclosure. As shown in FIG. 12, in another power-taking mode, the power supply port of the first low-speed signal optoelectronic transmission module may directly acquire the voltage signal from the repeater. Specifically, the voltage output end of the repeater further includes a second voltage output end, and the power supply port of the first low-speed signal optoelectronic transmission module connects to the second voltage output end to acquire the voltage signal received by the repeater from the voltage input end.

On the basis of the receiving end plug shown in any of the previous embodiments, the present disclosure provides an active cable, which includes a sending end plug, an optical cable and a receiving end plug, and the sending end plug is configured for connecting the source to receive the signal sent by the source, and transmit the signal to the receiving end plug through the optical cable.

A structure of an active cable will be described with reference to FIG. 13 below. FIG. 13 shows a schematic structural diagram of an active cable 1300 according to some embodiments of the present disclosure. As shown in FIG. 13, in the active cable shown in some embodiments, the receiving end plug includes a first high-speed signal optoelectronic transmission module and a first low-speed signal optoelectronic transmission module, and the sending end plug includes a second high-speed signal optoelectronic transmission module and a second low-speed signal optoelectronic transmission module. In the optical cable, an electrical signal sent from the source will be transmitted in the form of light signal. Therefore, before transmitting the signal from the source through the optical cable, the second high-speed signal optoelectronic transmission module and the second low-speed signal optoelectronic transmission module in the sending end plug will optoelectronically convert the signal to output the signal in the form of light signal. When the optical cable transmits the signal in the form of light signal to the receiving end plug, the first high-speed signal optoelectronic transmission module and the first low-speed signal optoelectronic transmission module will optoelectronically convert the signal in the form of light signal to the signal in the form of electrical signal.

Specifically, the second high-speed signal optoelectronic transmission module connects to the first high-speed signal optoelectronic transmission module through an optical cable to form a transmission channel for high-speed signals sent by the source, and the second low-speed signal optoelectronic transmission module connects to the first low-speed signal optoelectronic transmission module through an optical cable to form a transmission channel for low-speed signals sent by the source.

Further, the power supply port of the first low-speed signal optoelectronic transmission module connects to the high-speed signal line between the first high-speed signal optoelectronic transmission module and the repeater to take electric power from the high-speed signal line. The power supply port of the first low-speed signal optoelectronic transmission module connects to the high-speed signal line to take electric power from the high-speed signal line, or connected to the second voltage output end of the repeater to get a voltage signal from the repeater.

The structures of the repeater, the receiving end plug and the active cable used in the signal transmitting solution shown in the present disclosure have been described in detail above. In order to clearly explain the signal transmitting process, a power supply process of the repeater, a signal conversion process of the receiving end plug and a signal transmitting process by using the active cable will be described below.

First, the power supply process of the repeater is described in combination with the structure of the repeater. The structure of the repeater of this embodiment may be as shown in FIG. 6. Correspondingly, the repeater can complete power supply in the signal transmitting process by performing the following steps: in response to receiving a voltage signal from a voltage receiving end, transmitting, by the repeater, the voltage signal from the first voltage output end to the signal receiving end to provide a first voltage signal required by the signal receiving end.

Further, the repeaters in other embodiments of the present disclosure may be as shown in FIG. 10, including a switch circuit and a second connector for connecting the signal sending end, and the second connector includes a voltage input pin, the first input end of the switch circuit connects to a voltage input pin of the second connector, a second input end of the switch circuit connects to the first connector, and an output end of the switch circuit connects to the first voltage output end of the repeater. Correspondingly, the repeater can complete power supply control during signal transmitting process by performing the following steps: in response to the voltage signal of the voltage input pin of the second connector being smaller than the first threshold, connecting, by the switch circuit, the second input end of the switch circuit with the output end of the switch circuit to connect a voltage input pin of the first connector with the first voltage output end; and in response to the voltage signal of the voltage input pin of the second connector being greater than or equal to the first threshold, connecting, by the switch circuit, the first input end of the switch circuit with the output end of the switch circuit to connect a voltage input pin of the second connector with the output end of the switch circuit.

Alternatively or further, the second connector is respectively connected with the high-speed signal line and the first connector. The repeater can complete power supply control during signal transmitting process by performing the following step: in response to that the repeater receives the voltage signal, transmitting, by the repeater, the voltage signal to the high-speed signal line of the signal sending end through the first connector and the second connector to serve as a power supply signal of a optoelectronic transmission module of the receiving end plug.

For example, the repeaters according to some other embodiments of the present disclosure may further include a voltage converting circuit, and an input end of the voltage converting circuit is configured for receiving a voltage signal, and an output end of the voltage converting circuit is connected to a high-speed signal line. Correspondingly, the repeater can transmit the voltage signal to the high-speed signal line by performing the following step: converting, by the voltage converting circuit, the voltage signal into a step-down signal and transmitting the step-down signal to the high-speed signal line.

Then, combined with the structure of the receiving end, a signal form conversion process of the receiving end plug is explained. As shown in FIG. 11, the optoelectronic transmission module in the receiving end plug includes a first high-speed signal optoelectronic transmission module and a first low-speed signal optoelectronic transmission, and a power supply port of the first high-speed signal optoelectronic transmission module connects to the high-speed signal line between the first high-speed signal optoelectronic transmission module and the repeater, and a power supply port of the first low-speed signal optoelectronic transmission module connects to the high-speed signal line of the receiving end plug.

In another embodiment, the first low-speed signal optoelectronic transmission module may also adopt another electric power taking way. As shown in FIG. 12, the optoelectronic transmission module in the receiving end plug includes a first high-speed signal optoelectronic transmission module and a first low-speed signal optoelectronic transmission, and a power supply port of the first high-speed signal optoelectronic transmission module connects to the high-speed signal line between the first high-speed signal optoelectronic transmission module and the repeater, and a power supply port of the first low-speed signal optoelectronic transmission module connects to the second voltage output end of the repeater.

Further, the high-speed signal line of the repeater connects to the high-speed signal line of the receiving end plug, and the low-speed signal line of the repeater connects to the low-speed signal line of the receiving end plug. Correspondingly, the receiving end plug completes signal conversion by performing the following steps:

converting, by the first high-speed signal optoelectronic transmission module, the received high-speed light signal into a first high-speed electrical signal, and transmitting the first high-speed electrical signal to the signal receiving end via the receiving end plug and the high-speed signal line of the repeater; and converting, by the first high-speed signal optoelectronic transmission module, the received low-speed light signal into a first low-speed electrical signal, and transmitting the first low-speed electrical signal to the signal receiving end via the receiving end plug and the low-speed signal line of the repeater.

The optical cable in the active cable may be composed of multiple optical fibers, and the above-mentioned high-speed light signal and low-speed light signal are transmitted from the sending end plug to the receiving end plug through the optical cable. Specifically, the optical cable may include a high-speed signal transmission light channel and a low-speed signal transmission light channel, and the high-speed signal transmission light channel is configured for transmitting high-speed light signals and the low-speed signal transmission light channel is configured for transmitting low-speed light signals.

The receiving end plug includes a first high-speed signal optoelectronic transmission module and a first low-speed signal optoelectronic transmission module, and the first high-speed signal optoelectronic transmission module is connected to the high-speed signal line of the receiving end plug and used for receiving a high-speed light signal from the high-speed signal transmission light channel and converting the high-speed light signal into a high-speed electrical signal. The first low-speed signal optoelectronic transmission module is connected to the low-speed signal line of the receiving end plug and used for receiving a low-speed light signal from the low-speed signal transmission light channel and converting the low-speed light signal into a low-speed electrical signal. The high-speed signal line of the receiving end plug connects to the high-speed signal line of the repeater, and the low-speed signal line of the receiving end plug connects to the low-speed signal line of the repeater.

The repeater includes a voltage input end and a first voltage output end, and the voltage input end is configured for receiving a voltage signal from other than the signal sending end, and the first voltage output end is configured for connecting the signal receiving end. In practical application, the signal receiving end is a display device, and the voltage input end of the repeater can acquire the voltage signal from an USB interface or other interfaces except the HDMI interface on the display device, or the voltage input end can also acquire the voltage signal from an external power supply. The voltage signal is output to the HDMI interface of the display device through the first voltage output end as a driving voltage of the HDMI interface, and when the high-speed electrical signal is received at the HDMI interface, the display device in the dormant state is awakened, and then a video and/or an audio provided by the source are displayed or played.

Because the first high-speed signal optoelectronic transmission module and the first low-speed signal optoelectronic transmission module needs a power supply voltage to complete the optoelectronic conversion of signals, in order to meet the requirements of the first high-speed signal optoelectronic transmission module and the first low-speed signal optoelectronic transmission module for the power supply voltage, the power supply port of the first high-speed signal optoelectronic transmission module is connected to the high-speed signal line of the receiving end plug, and the power supply port of the first low-speed signal optoelectronic transmission module is connected to the high-speed signal line of the receiving end plug or the second voltage output end of the repeater. The high-speed signal line is also connected with the voltage signal pulled up to 3.3V through a magnetic bead to strengthen the voltage signal on the high-speed signal line, to ensure that the first high-speed signal optoelectronic transmission module and/or the first low-speed signal optoelectronic transmission module can acquire electric power from the high-speed signal line of the receiving end plug, to work normally.

A specific process of the power supply process is as follows: in response to that the repeater receives the voltage signal from the voltage receiving end, transmitting, by the repeater, the voltage signal to the high-speed signal line. It should be noted that if the repeater receives a voltage signal from the display device or the voltage signal is a 5V voltage signal from an external power supply, a voltage converting circuit is also set in the repeater to step down the voltage, to output a 3.3V step-down signal to the high-speed signal line. After the repeater transmits the voltage signal to the high-speed signal line, in response to that the first high-speed signal optoelectronic transmission module receives the high-speed electrical signal, the first high-speed signal optoelectronic transmission module acquires the power supply signal from the high-speed signal line of the receiving end plug, and then the first high-speed signal optoelectronic transmission module works normally, that is, the received high-speed light signal may be converted into the first high-speed electrical signal and transmitted to the signal receiving end through the receiving end plug and the high-speed signal line of the repeater.

The power supply port of the first low-speed signal optoelectronic transmission module connected to the high-speed signal line of the receiving end plug or the second voltage output end to acquire electric power. Alternatively, the receiving end plug includes a controller and a power switch. The controller controls the power switch to be turned on and off. The power switch controls the connection and disconnection between the high-speed signal line of the receiving end plug and the power supply port of the first low-speed signal optoelectronic transmission module. Before the receiving end plug is connected to the display device, the controller of the receiving end plug ensures that the power supply port of the first low-speed signal optoelectronic transmission module is disconnected from the high-speed signal line of the connector plug by disconnecting the power switch. The first high-speed signal optoelectronic transmission module responds to receiving a preset high-speed light signal, and the controller of the receiving end plug controls the power switch to be turned on, and the first low-speed signal optoelectronic transmission module acquires electric power from the high-speed signal line of the connector plug.

In some embodiments, a controller, a switch and/or a switch circuit for power supply control may be arranged inside the repeater, and the process of completing power supply control through the controller, the switch and/or the switch circuit has been described in detail in the previous embodiments, and will not be repeated here. Through the controller, the switch and/or the switch circuit, the repeater can connect the voltage input end of the repeater and the first voltage output end when the display device is in the dormant state and the power supply voltage of the HDMI interface is insufficient, to output the acquired voltage signal to the HDMI interface of the display device and supply power to the HDMI interface, and the voltage input end of the repeater and the first voltage output end are disconnected under the condition that the display device is in the awake state or the power supply voltage of the HDMI interface is sufficient, to save energy.

It should be noted that the repeater may be connected to the HDMI interface in the display device through an HDMI connector, that is, the first voltage output end is a power output pin of the HDMI connector. The specific connection structure has been described in detail in the previous embodiments, and will not be described here.

Although a number of embodiments of the present disclosure have been shown and described herein, such embodiments are provided by way of example only. Alteration and substitutions without departing from the embodiments of the present disclosure. It should be understood that various alternatives to the embodiments of the present disclosure described herein can be adopted in the practice of the present disclosure. The appended claims are intended to define the scope of protection of the present disclosure, and therefore cover equivalents or alternatives within the scope of these claims.

What is claimed is:

1. A receiving end, comprising:
a first high-speed signal optoelectronic transmission module and a first low-speed signal optoelectronic transmission module, wherein:
a power supply port of the first high-speed signal optoelectronic transmission module connects to a high-speed signal line of the receiving end, and a power supply port of the first low-speed signal optoelectronic transmission module connects to the high-speed signal line of the receiving end through a power switch;
wherein the receiving end is configured to:
before plugging into a destination end, the first high-speed signal optoelectronic transmission module acquires electric power from the high-speed signal line of the receiving end; wherein, after the first high-speed signal optoelectronic transmission module receives a first preset high-speed light signal or a second preset high-speed light signal transmitted from an optical fiber, setting, by the first high-speed signal optoelectronic transmission module, a light signal idle flag thereof to an invalid state,
the first preset high-speed light signal is a high-speed light signal converted from a high-speed electrical signal generated when a sending end, corresponding to the receiving end, monitors a second low-speed electrical signal on a low-speed data line of the send end;
the second preset high-speed light signal is a high-speed light signal converted from a second preset high-speed electrical signal sent after a source being awakened; and
in response to the light signal idle flag of the first high-speed signal optoelectronic transmission module being in the invalid state, the power switch is turned on, accordingly the first low-speed signal optoelectronic transmission module acquires electric power from the high-speed signal line of the receiving end, and the first low-speed signal optoelectronic transmission module starts working normally.

2. The receiving end according to claim 1, comprising:
a noise suppression module;
the power supply port of the first high-speed signal optoelectronic transmission module connects to the high-speed signal line of the receiving end through the noise suppression module, and the noise suppression module is configured to suppress high-frequency noise and spike interference from the high-speed signal line of the receiving end.

3. The receiving end according to claim 2, wherein, the noise suppression module is a magnetic bead.

4. The receiving end according to claim 1, further comprising: a controller; wherein, the controller is configured to control on-off of the power switch.

5. The receiving end according to claim 4, wherein, the controller connects to the first low-speed signal optoelectronic transmission module through a configuration interface; and wherein the configuration interface is for configuring the first low-speed signal optoelectronic transmission module to work normally through the configuration interface.

6. The receiving end according to claim 4, wherein, the controller is integrated in the first high-speed signal optoelectronic transmission module.

7. A signal transmitting device, the device comprising:
a receiving end connected to a first end of an optical fiber, wherein
the receiving end comprises:
a first high-speed signal optoelectronic transmission module and a first low-speed signal optoelectronic transmission module, and
a power supply port of the first high-speed signal optoelectronic transmission module connects to a high-speed signal line of the receiving end,
a power supply port of the first low-speed signal optoelectronic transmission module connects to the high-speed signal line of the receiving end through a power switch, a second end of the optical fiber connects to a sending end; and
the sending end comprises:
a second high-speed signal optoelectronic transmission module and a second low-speed signal optoelectronic transmission module; and
when the receiving end is plugged into a destination end, the first high-speed signal optoelectronic transmission module acquires electric power from the high-speed signal line of the receiving end;
after the first high-speed signal optoelectronic transmission module receives a first preset high-speed light signal or a second preset high-speed light signal transmitted from the optical fiber, setting, by the first high-speed signal optoelectronic transmission module, a light signal idle flag thereof to an invalid state; wherein the first preset high-speed light signal is a high-speed light signal converted from high-speed electrical signal generated when a sending end, corresponding to the receiving end, monitors a second low-speed electrical signal on a low-speed data line of a second end; the second preset high-speed light signal is a high-speed light signal converted from a second preset high-speed electrical signal sent after a source being awakened;
in response to the light signal idle flag of the first high-speed signal optoelectronic transmission module being in the invalid state, the power switch is turned on, accordingly the power supply of the first low-speed signal optoelectronic transmission module acquires electric power from the high-speed signal line of the receiving end, and the first low-speed signal optoelectronic transmission module starts working normally; and
the first low-speed signal optoelectronic transmission module converts a low-speed light signal received from an optical fiber into a first low-speed electrical signal and transmits the first low-speed electrical signal to the destination end; wherein, the low-speed light signal is converted from the first low-speed electrical signal by the second low-speed signal optoelectronic transmission module and transmitted to the optical fiber, and when the sending end is plugged into the source, the second low-speed signal optoelectronic transmission module receives the first low-speed electrical signal from the source.

8. The signal transmitting device according to claim 7, wherein, the receiving end comprises a controller:
in response to the destination end being awakened, controlling, by the controller, the power switch to turn on, wherein the first low-speed signal optoelectronic transmission module acquires electric power from the high-speed signal line of the receiving end.

9. The signal transmitting device according to claim 8, wherein, the controller connects to the first low-speed signal optoelectronic transmission module through a configuration interface; for configuring the first low-speed signal optoelectronic transmission module to work normally through the configuration interface.

10. The signal transmitting device according to claim 7, wherein, when the first high-speed signal optoelectronic transmission module has not received a high-speed light signal for a preset time period, setting, by the first high-speed signal optoelectronic transmission module, the light signal idle flag thereof to a valid state.

11. The signal transmitting device according to claim 10, wherein, the receiving end comprises a controller;

the method further comprises in response to the light signal idle flag of the first high-speed signal optoelectronic transmission module being in the valid state, controlling, by the controller, the power switch to be turned off.

12. The signal transmitting device according to claim 10, wherein, the receiving end comprises a controller;

the method further comprises:

after the first high-speed signal optoelectronic transmission module receives the first preset high-speed light signal transmitted from the optical fiber, the first high-speed signal optoelectronic transmission module converts the first preset high-speed light signal into a first preset high-speed electrical signal, and then outputs the first preset high-speed electrical signal to the destination end; wherein, when a low-speed signal monitoring function of the second high-speed signal optoelectronic transmission module monitors a second low-speed electrical signal on a low-speed data line, the second high-speed signal optoelectronic transmission module generates the first preset high-speed electrical signal, converts the first preset high-speed electrical signal into the first preset high-speed light signal and transmits the first preset high-speed light signal to the optical fiber; and in response to the light signal idle flag of the first high-speed signal optoelectronic transmission module being in the invalid state, the controller controls the power switch to be turned on.

13. The signal transmitting device according to claim 10, wherein, the receiving end comprises: a controller;

after the first high-speed signal optoelectronic transmission module receives a second preset high-speed light signal transmitted from the optical fiber, converts the second preset high-speed light signal into a second preset high-speed electrical signal, and then outputs the second preset high-speed electrical signal to the destination end; wherein, after the second high-speed signal optoelectronic transmission module receives the second preset high-speed electrical signal transmitted by the source after being awakened, the second high-speed signal optoelectronic transmission module converts the second preset high-speed electrical signal into the second preset high-speed light signal, and then transmits the second preset high-speed light signal to the optical fiber; and in response to the light signal idle flag of the first high-speed signal optoelectronic transmission module being in the invalid state, the controller controls the power switch to be turned on.

14. A pure-optical active cable, comprising:

a receiving end, an optical fiber and a sending end; and the receiving end comprises: a first high-speed signal optoelectronic transmission module, a first low-speed signal optoelectronic transmission module and a power switch;

a power supply port of the first high-speed signal optoelectronic transmission module connects to a high-speed signal line of the receiving end, and a power supply port of the first low-speed signal optoelectronic transmission module connects to the high-speed signal line of the receiving end through the power switch;

after the first high-speed signal optoelectronic transmission module receives a first preset high-speed light signal or a second preset high-speed light signal transmitted from the optical fiber, setting, by the first high-speed signal optoelectronic transmission module, the light signal idle flag thereof to an invalid state;

in response to the light signal idle flag of the first high-speed signal optoelectronic transmission module being in the invalid state, the power switch is turned on, the power supply of the first low-speed signal optoelectronic transmission module acquires electric power from the high-speed signal line of the receiving end, and the first low-speed signal optoelectronic transmission module starts working normally; and, the sending end comprises: a second high-speed signal optoelectronic transmission module and a second low-speed signal optoelectronic transmission module;

the second high-speed signal optoelectronic transmission module connected to the first high-speed signal optoelectronic transmission module through the optical fiber, and the second low-speed signal optoelectronic transmission module connected to the first low-speed signal optoelectronic transmission module through a second optical fiber;

when the second high-speed signal optoelectronic transmission module monitors a second low-speed electrical signal on a low-speed data line, the second high-speed signal optoelectronic transmission module generates a first preset high-speed electrical signal, converts the first preset high-speed electrical signal into a first preset high-speed light signal, and transmits the first preset high-speed light signal to the optical fiber; or after the second high-speed signal optoelectronic transmission module receives a second preset high-speed electrical signal transmitted by the source after being awakened, the second high-speed signal optoelectronic transmission module converts the second preset high-speed electrical signal into the second preset high-speed light signal, and then transmits the second preset high-speed light signal to the second optical fiber.

15. The pure-optical active cable according to claim 14, wherein, when the receiving end is plugged to a destination end, the first high-speed signal optoelectronic transmission module acquires electric power from the high-speed signal line of the receiving end; and the first low-speed signal optoelectronic transmission module acquires electric power from the high-speed signal line of the receiving end; and when the sending end is plugged to a source, the second high-speed signal optoelectronic transmission module and the second low-speed signal optoelectronic transmission module respectively acquire electric power from the source; and the second low-speed signal optoelectronic transmission module converts a first low-speed electrical signal received from the source into a low-speed light signal and transmits the low-speed light signal to the first low-speed signal optoelectronic transmission module through the second optical fiber; and the first low-speed signal optoelectronic transmission module converts the low-speed light signal into the first low-speed electrical signal and transmits the first low-speed electrical signal to the destination end.

16. The pure-optical active cable according to claim 14, wherein, when the second high-speed signal optoelectronic transmission module recognizes that the source enters into a sleep state, the second high-speed signal optoelectronic transmission module stops sending a high-speed light signal to the first high-speed signal optoelectronic transmission module; and the second high-speed signal optoelectronic transmission module enables a low-speed signal monitoring function of the second high-speed signal optoelectronic transmission module; and when the first high-speed signal optoelectronic transmission module does not receive a high-speed light signal for a preset time period, the first high-speed signal optoelectronic transmission module sets the light signal idle flag thereof to a valid state.

17. The pure-optical active cable according to claim 16, wherein, the receiving end comprises: a controller when the first high-speed signal optoelectronic transmission module does not receive the high-speed light signal for a preset time period, the controller controls the power switch to be turned off.

18. The pure-optical active cable according to claim 16, wherein, the receiving end comprises: a controller;

after the first high-speed signal optoelectronic transmission module receives the first preset high-speed light signal transmitted from the optical fiber, the second high-speed signal optoelectronic transmission module is converted to a normal transmission mode; and the second high-speed signal optoelectronic transmission module configures the second low-speed signal optoelectronic transmission module to be in a normal working mode;

after the first high-speed signal optoelectronic transmission module receives the first preset high-speed light signal transmitted from the optical fiber, the first high-speed signal optoelectronic transmission module converts the first preset high-speed light signal into the first preset high-speed electrical signal, and then outputs the first preset high-speed electrical signal to a destination end; and in response to the light signal idle flag of the first high-speed signal optoelectronic transmission module being in the invalid state, the controller controls the power switch to be turned on.

19. The pure-optical active cable according to claim 16, wherein, the receiving end comprises: a controller, after the second high-speed signal optoelectronic transmission module receives the second preset high-speed light signal transmitted from the optical fiber, the second high-speed signal optoelectronic transmission module is converted to a normal transmission mode; and after the first high-speed signal optoelectronic transmission module receives the second preset high-speed light signal transmitted from the optical fiber, setting, by the first high-speed signal optoelectronic transmission module, the light signal idle flag thereof to the invalid state, converting the second preset high-speed light signal into a second preset high-speed electrical signal, and then outputting the second preset high-speed electrical signal to a destination end;

in response to the light signal idle flag of the first high-speed signal optoelectronic transmission module being in the invalid state, the controller controls the power switch to be turned on, the power supply of the first low-speed signal optoelectronic transmission module becomes normal, and the first low-speed signal optoelectronic transmission module starts working normally; and the second low-speed signal optoelectronic transmission module configures the second low-speed signal optoelectronic transmission module to be in a normal working mode.

20. The pure-optical active cable according to claim 14, comprising: an adapter and a connector; wherein:

the second high-speed signal optoelectronic transmission module connects to the first high-speed signal optoelectronic transmission module through the optical fiber following at least one section of an intermediate optical fiber, and the second low-speed signal optoelectronic transmission module connects to the first low-speed signal optoelectronic transmission module through the second optical fiber following at least one section of another intermediate optical fiber;

wherein, sections of intermediate optical fibers are connected in sequence, wherein splicing between two adjacent sections of optical fiber is realized by setting adapters at ends of two optical fibers to be spliced and inserting the adapters into a connector.

\* \* \* \* \*